(12) United States Patent
Tanaka et al.

(10) Patent No.: US 11,247,266 B2
(45) Date of Patent: Feb. 15, 2022

(54) POROUS SINTERED BODY AND METHOD OF MAKING THE SAME

(71) Applicant: TAISEI KOGYO CO., LTD., Neyagawa (JP)

(72) Inventors: Shigeo Tanaka, Neyagawa (JP); Yasuhiro Kanoko, Neyagawa (JP)

(73) Assignee: TAISEI KOGYO CO., LTD., Osaka (JP)

( * ) Notice: Subject to any disclaimer, the term of this patent is extended or adjusted under 35 U.S.C. 154(b) by 776 days.

(21) Appl. No.: 14/408,776

(22) PCT Filed: Mar. 5, 2014

(86) PCT No.: PCT/JP2014/055676
§ 371 (c)(1),
(2) Date: Nov. 6, 2015

(87) PCT Pub. No.: WO2014/136849
PCT Pub. Date: Sep. 12, 2014

(65) Prior Publication Data
US 2016/0074939 A1    Mar. 17, 2016

(30) Foreign Application Priority Data
Mar. 5, 2013 (JP) .............................. JP2013-042838

(51) Int. Cl.
*B22F 3/11* (2006.01)
*C22C 1/08* (2006.01)
(Continued)

(52) U.S. Cl.
CPC ............ *B22F 3/114* (2013.01); *B22F 3/1003* (2013.01); *B22F 3/1112* (2013.01);
(Continued)

(58) Field of Classification Search
CPC .................................................... B22F 3/1137
See application file for complete search history.

(56) References Cited

U.S. PATENT DOCUMENTS 5,496,650 A   3/1996  Sugikawa
5,531,955 A   7/1996  Sugikawa
(Continued)

FOREIGN PATENT DOCUMENTS

JP   63-255304 A   10/1988
JP   07-118706 A    5/1995
(Continued)

OTHER PUBLICATIONS

International Search Report dated Jun. 3, 2014, issued in corresponding application No. PCT/JP2014/055676.

*Primary Examiner* — Mark Ruthkosky
*Assistant Examiner* — Julia L Rummel
(74) *Attorney, Agent, or Firm* — Westerman, Hattori, Daniels & Adrian, LLP

(57) ABSTRACT

[Object]
There is provided a porous sintered body has a uniform porosity, a high level of freedom in body formation which allows formation into varieties shapes and various levels of porosity, and a very large surface area.
[Solution]
The porous sintered body includes: hollow cores which follow a vanished shape of an interlaced or otherwise structured fibriform vanisher material; sintered walls 226 which extend longitudinally of the cores and obtained by sintering a first sintering powder held around the cores; and voids formed between the sintered walls. The cores and the voids communicate with each other via absent regions formed in the sintered walls. The sintered walls have surfaces formed with a sintered microparticulate layer 232 made from a material containing a second sintering powder (Continued)

which has a smaller diameter than the first sintering powder, and has predetermined pores 231.

19 Claims, 21 Drawing Sheets

(51) Int. Cl.
| | |
|---|---|
| *C04B 38/06* | (2006.01) |
| *C04B 35/00* | (2006.01) |
| *C04B 38/00* | (2006.01) |
| *C04B 20/10* | (2006.01) |
| *B22F 3/10* | (2006.01) |
| *B22F 7/00* | (2006.01) |
| *B22F 7/04* | (2006.01) |
| *C04B 111/00* | (2006.01) |

(52) U.S. Cl.
CPC .......... *B22F 3/1137* (2013.01); *B22F 3/1146* (2013.01); *B22F 7/002* (2013.01); *C04B 20/1066* (2013.01); *C04B 35/00* (2013.01); *C04B 38/0041* (2013.01); *C04B 38/06* (2013.01); *C22C 1/08* (2013.01); *B22F 7/04* (2013.01); *B22F 2201/20* (2013.01); *B22F 2998/10* (2013.01); *B22F 2999/00* (2013.01); *C04B 2111/0081* (2013.01); *C04B 2111/00836* (2013.01); *C04B 2111/00844* (2013.01); *C04B 2111/00853* (2013.01)

(56) References Cited

U.S. PATENT DOCUMENTS

| | | | |
|---|---|---|---|
| 6,547,967 B1 * | 4/2003 | Adler | B01D 53/885 |
| | | | 210/500.25 |
| 2004/0101706 A1 | 5/2004 | Bohm et al. | |
| 2009/0202821 A1 * | 8/2009 | Tanaka | B22F 3/1021 |
| | | | 428/338 |
| 2012/0144958 A1 * | 6/2012 | Olson, III | B01D 39/2093 |
| | | | 75/412 |

FOREIGN PATENT DOCUMENTS

| | | |
|---|---|---|
| JP | 2005-505693 A | 2/2005 |
| JP | 2007-262571 A | 10/2007 |
| JP | 06-299273 A | 10/2014 |
| WO | 03/033192 A2 | 4/2003 |

\* cited by examiner 5 6 7

POROUS SINTERED BODY AND METHOD OF MAKING THE SAME

FIELD OF THE INVENTION

The present invention relates to porous sintered bodies. Specifically, the invention relates to porous sintered bodies which are highly porous, have high levels of freedom in forming, and have increased surface areas provided by micro particles sintered on surfaces.

BACKGROUND ART

Highly porous metal sheets, for example, are used as electrode base materials for nickel-hydrogen batteries and lithium batteries, and electrode base materials for fuel cells. Further, they are used widely in many other fields such as biomaterials, catalyser base materials, and so on.

Conventionally, the porous metal sheet is obtained by first e.g., compressing a metal fiber into a sheet form, and then sintering the sheet. However, according to this method, it is difficult to achieve a uniform metal fiber density, and therefore has been difficult also, to obtain a porous metal sheet which has a uniform porosity.

In order to solve this problem, there is proposed a method for making a uniformly porous metal sheet which includes a process of uniformly dispersing a fibriform raw material or a powdery raw material within a dispersing chamber of a packing apparatus, and then allowing the dispersed raw material to fall on a substrate placed beneath.

LIST OF REFERENCES

Patent Literature

Patent Literature: JP-A 2007-262571

SUMMARY OF THE INVENTION

Problems to be Solved by the Invention

The method described above is capable of forming a porous metal sheet of a uniform porosity. However, it is difficult to obtain thin porous sheets having a thickness of a few micrometers through a few tens of micrometers because the method employs a raw material which has a diameter of 10 µm through 100 µm. On the other hand, it is also difficult, with the above-described fibriform metal, to forma shape which has a greater thickness such as a few millimeters through a few tens of millimeters while maintaining the uniform porosity. In other words, there is a limitation to the form of formed bodies. In still other words, level of freedom in forming a porous sintered body is low.

The porous body is formed by using fibriform metals or powdery metal which have such dimensions and forms as capable of providing skeletal structures of the porous body. Therefore, the thickness and porosity of the formed body are determined by the shape and dimensions of these members. For this reason, it is difficult to make a wide range of metal porous bodies of a variety of shapes and porosities.

Another problem is that powdery metal in dispersion liquid tends to precipitate quickly, to concentrate in a lower layer. This means that although it is possible to make porous sintered bodies having a uniform density or composition of the powdery metal in surface directions, it is difficult to make one which has a uniform density or composition in the thickness direction.

When a metal porous body is utilized as a catalyser, it is the surface of the fibriform metal or of the powdery metal that provides functions as the catalyser. In order to increase the surface area, it is necessary that the fibriform metal has a small diameter, or the powdery metal has a small particle size, which, however, poses a problem of poor form retention during formation and sintering. Because of this, if a fibriform metal or a powdery metal of a small dimension is used directly to form a porous body preparation, it is impossible to obtain a metal porous body of a desired form or porosity.

An object of the present invention is to solve the above-described problems and to provide a porous sintered body which has a uniform porosity, a high level of freedom in body formation which allows formation into varieties of shapes and various levels of porosity, and a very large surface area.

Solution to the Problems

An invention disclosed in the present application is a porous sintered body which includes: hollow cores following a vanished shape of an interlaced or otherwise structured fibriform vanisher material; sintered walls extending longitudinally of the cores and obtained by sintering a first sintering powder held around the cores; and voids between the sintered walls. The cores and the voids communicate with each other via absent regions formed in the sintered walls. In this porous sintered body, the sintered walls have surfaces formed with a sintered microparticulate layer made from a material containing a second sintering powder having a smaller diameter than the first sintering powder, and the layer has predetermined pores.

A basic skeletal structure of the porous sintered body according to the present invention is formed by first having a sinterable, first sintering powder held on surfaces of an interlaced fibriform vanisher material, and then vanishing the fibriform vanisher material while sintering the first sintering powder which is held on the surface of the fiber.

The porous sintered body includes hollow cores resulting from vanishment of the fibriform vanisher material; sintered walls formed by sintering the power around the cores; and voids between the sintered walls. The voids result from spaces among the fibriform vanisher material. The sintered walls are formed to extend longitudinally of the cores. In other words, the sintered walls provide a porous body which follows an outer circumferential shape of the fibriform vanisher material and the manner how the material is interlaced. The porous body according to the present invention has a shape extending longitudinally of the fibriform vanisher material, and has pore spaces in both of the inner side and the outer side of the sintered walls which are obtained by sintering a powder. Therefore, it is possible to obtain a porous sintered backing body which has a greater porosity than that of a porous body which is formed by interlacing the fibriform vanisher material. Further, since the sintered walls have surfaces on both inner and outer sides, it is possible to form a porous sintered body which has a very large surface area.

Further, the sintered wall is structured so that the cores and the voids communicate with each other via absent regions. For example, under a state where outer circumferential regions of the fibriform vanisher material hold one through three layers of the sintering powder, some areas of the outer circumferential regions are not covered by the sintering powder, and these areas become the absent regions. By adjusting sintering temperatures, it is also possible to develop absent regions in the sintered wall, by causing shrinkage during the process of sintering. Especially, by causing necking sintering, it becomes possible to form absent regions which follow the state in which the powder is laminated or in which necking sintering takes place. Since the absent regions provides communication between the cores and the voids, not only the outer surface of the sintered wall but also the inner surface thereof which results from vanishment of the fibriform vanisher material, becomes as surfaces of the porous body. This makes it possible to dramatically increase the area for chemical reactions when the surfaces of the porous body is utilized as a catalyser, etc. It is possible to adjust the absent regions to have a required ratio, by adjusting the amount of application, sintering temperatures, etc. of the first sintering powder. In order to give sufficient strength to the skeletal structure, it is preferable that the absent regions is controlled to account for 50 through 20%.

In the present invention, it is also possible to apply the first sintering powder of a smaller diameter or to apply the first sintering powder to a smaller thickness on the outer circumference of the fibriform vanisher material, thereby making it possible to reduce the thickness of the sintered walls. Therefore, it is possible to have an extremely large porosity or surface area.

Further, if the first sintering powder applied around the fibriform vanisher material is brought to necking sintering, particles retain at least part of their shapes after sintering, in the form of corrugations which follow the diameter of the first sintering powder, on surfaces of the sintered walls. This arrangement makes it possible to further increase the surface area in the porous body.

There is no specific limitation to the material or the shape of the fibriform vanisher material as far as the vanisher material vanishes by the time when sintering of the first sintering powder is completed. Examples of usable material include not only natural fibers from Mitsumata (*Edgeworthia chrysantha*) and Kozo (*Broussonetia kazinoki×B. papyrifera*), etc. but also artificial fibers such as rayon. It is desirable, however, that the fibriform vanisher material retains itself until the first sintering powder begins sintering. It is not necessary that the fibriform vanisher material retain its shape until the first sintering powder has been melted together. It is only necessary that the fibriform vanisher material does not disappear until mutually adjacent particles of the first sintering powder begin to be bonded to each other byway of diffused junction. It is not necessary, either, that the fibriform vanisher material retain their fibrous composition. Rather, for example, the fibriform vanisher material may leave behind some residue component, such as carbides, etc., remaining among particles of the first sintering powder as shape-retaining components. Since the first sintering powder starts bonding by way of diffused junction at lower temperatures than fusing temperatures, it is possible to proceed with the sintering process while the first sintering powder stays in the shape following the outer circumference of the fibriform vanisher material. There may also be an arrangement that a component which is capable of remaining between particles of the first sintering powder thereby ensuring shape retention until the first sintering powder begins sintering is added in a slurry which is used in applying the first sintering powder to the fibriform vanisher material.

By selecting appropriate dimensions and a shape for the fibriform vanisher material, and a mode of interlacing, it is possible to obtain porous bodies of predetermined dimensions and shapes. Because the first sintering powder sinters while being retained on the outer circumferential surface of the fibriform vanisher material, it is now possible to obtain porous sintered bodies of various kinds of forms. Further, it is now possible to have a uniform porosity over the entire porous sintered body. For example, it is now possible to make a series of porous sintered bodies, ranging from a very thin sheet-like porous sintered body to a thick, three-dimensional porous sintered body, of a uniform porosity and predetermined shapes.

There is no specific limitation to material from which the first sintering powder is made. There may be an arrangement that the first sintering powder includes two or more different kinds of sintering powders for formation of the sintered walls. It is also possible to form the sintered walls from the first sintering powder which contains a non-sintering powder.

There is no specific limitation, either, to the particle size of the first sintering powder. It is necessary, however, that the particle is of a size which can be held in a sinterable density around the fibriform vanisher material. For example, an average particle size may be $1/5$ through $1/50$ of the diameter of the fibriform vanisher material.

If the first sintering powder has a particle size which is greater than $1/5$ of the diameter of the fibriform vanisher material, it becomes difficult to hold the first powder around the fibriform vanisher material. On the other hand, if the first powder's average particle size is smaller than $1/50$ of the diameter of the fibriform vanisher material, it becomes impossible to retain the form or achieve the strength during and/or after sintering.

The first sintering powder may contain a first powder element which has a higher sintering initiation temperature and a second powder element which has a lower sintering initiation temperature. By using powders of different sintering initiation temperatures, it becomes possible to ensure shape retention during sintering.

The first powder element and the second powder element may be provided by different metal powders. If they are of the same metal, their particle size may be differentiated so that one has a lower sintering initiation temperature. For example, the second powder element which has an average particle size not greater than $1/10$ of an average particle size of the first powder element has an increased surface activity, making it possible to use a lower temperature as the sintering initiation temperature. The sintering initiation temperature need not be the melting temperature of the powder element, but may be lower temperatures as far as required shape retention is exhibited to the first powder element at such temperatures. For example, as the surface activity increases, there is developed an adhesive force between the first powder element and the second powder element. This makes it possible to obtain shape retention longitudinally of the fibriform vanisher material even if the powders do not become molten.

The first powder element may have a higher sintering initiation temperature than a vanishing completion temperature of the fibriform vanisher material, whereas the second powder element has a lower sintering initiation temperature than a vanishing completion temperature of the fibriform vanisher material.

If the powder element has high sintering temperature, the fibriform vanisher material will disappear completely by the time the powder element begins sintering, leading to a problem that the sintering powder will not retain its shape along the outer circumference of the fibriform vanisher material during sintering. If sintering is performed under such a condition, sintered walls can have excessive deformation, making it impossible to obtain a porous sintered body of a required porosity or a required shape.

If the second powder element has a lower sintering initiation temperature than a vanishing completion temperature of the fibriform vanisher material, or if the second powder element has a level of surface activity to agglutinate adjacent particles, it is then possible to fix the first powder element onto the outer circumferential regions of the fibriform vanisher material via the second powder element before the fibriform vanisher material varnishes. By sintering particles of the first powder element thereafter, it becomes possible to sinter the first sintering powder while keeping the powder along the outer circumferential surface of the fibriform vanisher material.

It is possible to sinter the second powder element in a bridging manner with respect to the first powder. This is made possible if the second powder element has a lower sintering initiation temperature than that of the first powder element, and the two powders are mixed with each other at an appropriate ratio. Then, the second powder sinters to particles of the first powder in a bridging manner. This arrangement provides an advantage in cases where the first powder element has a high sintering initiation temperature, that the second powder element keeps positional relationship among particles of the first powder element during the sintering, making it possible to obtain porous sintered bodies having a uniform porosity.

Sometimes, a porous sintered body must be made from a powder which is hard to sinter, or does not sinter. For example, in cases where the first sintering powder is provided by a functional ceramic powder which has a very high sintering temperature, the ceramic powder will not sinter even after the fibriform vanisher material has vanished completely. In other words, it is impossible to obtain a sintered body which has a shape following the shape of the fibriform vanisher material. In such a case as the above, the ceramic powder is used as the first powder element, in combination with the second powder element which has a lower sintering temperature, so as to bridge to particles of the first powder. This arrangement also makes it possible to produce sintered walls having a sintered structure in which particles of the first powder element are not sintered with each other.

Further, according to the present invention, the sintered walls have surfaces formed with a sintered microparticulate layer made from a material containing a second sintering powder which has a smaller particle size than the first sintering powder. This sintered microparticulate layer has predetermined pores.

As the second sintering powder, it is preferable to use so called nano particles which have a particle size ranging from 20 nm through 1000 nm for example. Nano particles have sintering temperatures much lower than those for forming the sintered walls. Therefore, it is possible to form sintered microparticulate layers without altering the shape of the sintered walls. In addition, since the sintered walls according to the present invention 126 have very large surface areas, it is possible to hold a large amount of the micro particles on the surfaces of the sintered walls.

The sintered microparticulate layer is porous, and follows the shape of the sintered wall. Therefore, the pores follow the porous shape of the sintered wall. Further, according to the present invention, it is possible to form pores within the layer of micro particles.

Micro particles such as nano particles may be dispersed in a liquid and impregnated to the porous sintered backing member according to the present invention, thereby deposited on surfaces of the porous sintered backing member as a layer. The micro particles are difficult to disperse as raw particles, in a liquid. For this reason, a very thin layer of resin coat, for example, may be provided on surfaces of the micro particles, and the resin coat layer is given an electric a charge, for example, to repel each other, so that the micro particles are kept dispersed in the liquid.

The second sintering powder as applied onto the surface of the sintered wall is off the surface by a distance at least equal to the thickness of the resin coat layer. For this reason, when the resin coat layer vanishes or when sintering occurs, mutually adjacent micro particles move to contact and bond to each other, while on the other hand crack-like or wrinkle-like pores develop around these groups of mutually-bonded micro particles. The pores appear significantly if necking sintering is performed to the second sintering powder. As a result, it is possible to make the sintered microparticulate layer as a porous body, thereby further increasing the surface area of the porous sintered body. Further, because the porous body (sintered wall) which provides a backing member in the present invention has its surfaces covered with corrugations that have extremely complicated and irregular shapes, there is formed even a larger number of the pores over the entire surface.

Specifically, the porous sintered body according to the present invention can be designed to include three kinds of pores; namely, the voids which are provided by the spaces between the fibriform vanisher materials; hollows which are provided by the hollow shapes of the sintered wall, and pores which are formed in the sintered microparticulate layer added on surfaces of the sintered walls. Therefore, it is possible to form porous sintered bodies having a very large surface area not obtainable in the past.

The sintered microparticulate layer may be made porous by different methods also. An example is disclosed in the present application. Namely, a microparticulate pore formation member which has a predetermined particle size is applied onto surfaces of the sintered walls together with the second sintering powder; and the pore formation member is vanished in the second sintering step, which is the step of sintering the second sintering powder, or by performing a pore formation member vanishing step before the second sintering step. In this way, it is possible to form pores corresponding to the pore formation member.

Materials, shapes, dimensions, etc. of the microparticulate pore formation member may be selected depending on the sintering temperature of the second sintering powder, dispersion concentration of the second sintering powder in a slurry, dispersion characteristics thereof in the slurry, etc. By using the microparticulate pore formation member, it becomes possible to form pores of a required diameter at a high level of accuracy.

Further, it is possible to form the pores at least on a surface side of the sintered microparticulate layer, i.e., in a surface facing the void. There is no specific limitation to the method for forming the pores on the surface side. For example, a plural kinds of micro particles having different adhering speed to the sintered wall may be mixed together, so that a resulting layer will have its surface side containing the second sintering powder for formation of pores or containing the microparticulate pore formation member.

Also, the second application step may be performed twice or more times, to form a layer of the second sintering powder which contains the microparticulate pore formation member on the surface side.

There is no specific limitation to the size of the pores in the sintered microparticulate layer. The pores may have an average hole diameter of at least ⅕ to 100 times of the diameter of the micro particles. For example, it is preferable that the pores have a hole diameter of 5 nm through 1 µm.

As disclosed in the present application, the sintered microparticulate layer may be made of a material containing at least two different kinds of micro particle powders. The two or more kinds of micro particle powders at least include a sintering powder. The different kinds of micro particle powders may include those which are different in material, dimension or shape. For example, in cases where the second sintering powder includes micro particles of Ni and micro particles of Cr, it is possible to form a sintered microparticulate layer of a corrosion-resistant Ni—Cr alloy on the surface of the porous backing member.

As disclosed in the present application, the sintered microparticulate layer may be made of a material containing a non-sintering micro particle powder. For example, catalyser particles such as those made of titanium oxide sinter only at higher temperatures than the sintering temperature of the sintered walls. These particles may be mixed with the second sintering powder provided by, e.g., Ni which sinters at lower temperatures; applied onto the sintered wall; and then sintered. This way, it is possible to bond the catalyser particles in a bridging manner with the Ni micro particles. Further, the arrangement makes it possible to fix non-sintering micro particle powders within the sintered microparticulate layer. In other words, it is possible to fix the non-sintering micro particles without losing their catalyser function for example.

Further, as disclosed in the present application, the sintered microparticulate layer may include a plurality of layers having different compositions. For example, it is possible to make a layer of a micro particle powder of a certain composition on the surface side of the sintered microparticulate layer while making a layer of a different powder having a different composition on the sintered wall side of the sintered microparticulate layer. As an example, the first sintered microparticulate layer having a low sintering temperature (melting temperature) may be formed on a surface of the porous sintered backing member, and then a layer of the second micro particles of a non-sintering micro particles may be formed on a surface of the first sintered microparticulate layer. As a specific example, the first sintered microparticulate layer of Ni is formed on the surface of a porous backing member, then a layer of micro particles provided by titanium oxide is formed on the first sintered microparticulate layer, and then, sintering is performed. This way, it is possible to form a plurality of sintered microparticulate layers of different components.

As disclosed in the present application, part or all of particles in the second sintering powder, which constitute the sintered microparticulate layer, may be sintered while retaining at least part of their particle shapes. Also, as disclosed in the present application, it is also possible to obtain a body in which at least part of the particles in the second sintering powder of the sintered microparticulate layer are melted together without retaining their particle shapes.

There is no specific limitation to the shape or dimensions of the sintered walls according to the present invention. The sintered walls form correspondingly to the diameter of the fibriform vanisher material, and the shape/dimensions of the first sintering powder. For example, as disclosed in the present application, the cores may have a diameter of 5 µm through 100 µm. Further, it is preferable that the cores have a diameter of 10 µm through 50 µm. Also, the sintered wall may be made by sintering the first sintering powder which has an average particle size of 0.5 µm through 30 µm. It is more preferable, however, that the first sintering powder has an average particle size of 1 µm through 10 µm. The sintered walls may have an average thickness of 0.5 µm through 50 µm. It is more preferable, however, that the sintered wall has an average thickness of 1 µm through 10 µm. With these arrangements, it is possible to form porous sintered backing members which have required porosities and required strength, from various fibriform vanisher materials.

There is no specific limitation, either, to the configuration of the sintered microparticulate layer. For example, the sintered microparticulate layer may be formed by sintering the second sintering powder which has an average particle size of 20 nm through 1000 nm. Further, it is preferable that the second sintering powder is provided by so called submicron particles. For example, it is preferable that the second sintering powder has an average particle size of 30 nm through 900 nm. This makes it possible to sinter at low temperatures, and to obtain a sintered microparticulate layer which has required airspace. There is no specific limitation, either, to the thickness of the sintered microparticulate layer, and the layer may have a thickness of nm through 1000 nm. In cases where the sintered microparticulate layer is used as a catalyser layer, for example, then the thickness should more preferably be 300 nm through 1000 nm. This allows to form a sintered microparticulate layer which has a sufficient catalyser capabilities, on the surface of the porous sintered backing member. Some catalysers do not require that they cover the entire surface of the porous backing member. In such a case, the sintered microparticulate layer may be formed in a sporadic fashion on the surface of the porous sintered backing member.

There is no specific limitation, either, to the shape or dimensions of the porous sintered body according to the present invention. It is possible to obtain porous sintered bodies of various shapes and dimensions as far as the fibriform vanisher material which is utilized is interlaceable into such shapes and dimensions. For example, sheet-like porous bodies of a thickness 30 µm through 1000 µm are obtainable if wet papermaking method is employed as disclosed in the present application.

On the other hand, a water stream or an air stream may be employed to interlace the fibriform vanisher material in an accumulated fashion to obtain formed bodies of complex shapes and three-dimensional shapes. Then, by forming a sintered body on the surface of these fibers, porous sintered bodies of required shapes are obtained.

Varieties of methods may be employed in applying the sintering powder onto the outer circumferential surface of the fibriform vanisher material. For example, first, a porous body of a predetermined form is made from a fibriform vanisher material, and then a sintering powder is applied to outer circumferential surfaces of the fibriform vanisher material in this porous body. If, on the other hand, a sheet-like porous formed body is made by wet papermaking method, it is possible to cause the sintering powder to be held on outer circumferential surfaces of the fibriform vanisher material simultaneously while the fibers are being interlaced into the sheet-like porous body. Through these methods, it is possible to obtain porous sintered bodies having a uniform porosity and various different forms.

In a method of making a porous sintered body according to the present invention, there are performed: a fibriform vanisher material formation step in which a fibriform vanisher material is interlaced or otherwise structured into a porous body of a required shape; a first sintering powder application step in which a first sintering powder is applied onto outer circumferential surfaces of the fibriform vanisher material; and a vanishing material vanishing step in which the fibriform vanisher material is vanished. Then, the first sintering powder, which constitutes the porous body obtained from the above-described steps, is sintered in a first sintering step, to obtain a porous sintered backing member which includes: hollow cores resulting from vanishing the fibriform vanisher material; sintered walls extending longitudinally of the cores; and voids between the sintered walls; with the cores and the voids communicating with each other via absent regions formed in the sintered walls. Then, there are performed: a second sintering powder application step in which a powder containing a second sintering powder that has a smaller diameter than the first sintering powder is applied onto a surface of the sintered walls; and a second sintering step in which the second sintering powder is sintered thereby obtaining a sintered microparticulate layer formed with predetermined pores, on an outer circumference of the sintered walls. Through these steps, there is manufactured a porous sintered body which includes a sintered microparticulate layer on the surface of the porous backing member.

In the first sintering powder application step, it is preferable to apply one through three layers of the sintering powder on outer circumferential surfaces of the fibriform vanisher material. By forming one through three layers of the sintering powder on the outer circumferential surfaces of the fibriform vanisher material, it becomes more likely that the absent regions will form in the sintered walls, and the porous sintered backing member of a higher porosity is obtained.

By adjusting the sintering temperature and sintering time, it becomes possible to shrink the sintered walls by a predetermined amount, to form absent regions. The absent regions thus formed provide communication between the cores and the voids, thereby further increasing the surface area which can play part in catalyser reactions for example.

In the first sintering step, it is preferable that mutually adjacent powder particles are brought to necking sintering. By doing so, corrugations are formed on surfaces of the sintered walls, and the porous sintered backing member will have a very large inside surface area. The necking sintering can be implemented easily by adjusting the sintering temperature and time.

There is no specific limitation to the fibriform vanisher material formation step. For example, if making a sheet-like formed body, paper-making techniques such as wet paper-making method and methods for making non-woven cloth may be used. There is no specific limitation, either, to the first sintering powder application step. For example, the sintering powder may be dispersed in a slurry and impregnated to the formed body made of the fibriform vanisher material.

As disclosed in the present application, the fibriform vanisher material formation step may include: a slurry preparation step in which the fibriform vanisher material, the sinterable powder, and a dispersion liquid in which these components can stay in a mixed state in a dispersed fashion are mixed with each other thereby a slurry is prepared; and a paper-making step in which a sheet-like formed body is formed out of the slurry by means of a wet papermaking method. The first sintering powder application step may include a dehydrating-drying step in which the sheet-like formed-body that contains the slurry is dehydrated and/or dried, thereby allowing the powder to be held on outer circumferential surfaces of the interlaced fibriform vanisher material.

Also, as described in the present application, the first sintering powder application step may include: an impregnation step in which the porous body, that has been formed into a required shape in the fibriform vanisher material formation step, is impregnated with a slurry in which the first sintering powder is dispersed; and a dehydrating-drying step in which the formed body that contains the slurry is dehydrated and/or dried, thereby allowing the powder to be held on outer circumferential surfaces of the interlaced fibriform vanisher material.

The first sintering powder may include a first powder element and a second powder element which have different sintering temperatures, with the sintering step performed in such a manner that the second powder element will sinter to bridge the first powder before the first powder element begins sintering in the first sintering step.

Also, the first sintering step may be started before the fibriform vanisher material vanishes. By starting the first sintering step before the fibriform vanisher material disappears, it becomes possible to hold the first powder element along the outer circumferential surface of the fibriform vanisher material. This makes it possible to form cylindrical sintered walls which follow along the outer circumferential surfaces of the fibriform vanisher material. It is not necessary that the first sintering step causes the second powder element to become molten, as far as the element is bonded to exert required shape retention. For example, the second powder element may be heated only to become activated to exert a required amount of adhering force to surfaces of the first powder element, to hold the first powder element. It is also possible to arrange so that the first powder element has a particle size suitable for being held along the outer circumferential surface of the fibriform vanisher material, whereas the second powder element has a particle size suitable for finding ways to sit in gaps between particles of the first powder element held along the outer circumferential surface of the fibriform vanisher material. The arrangement allows the second powder element to sinter to bridge particles of the first powder element.

There may also be an arrangement that a powder element which functions the same way as the second powder element will appear in a sintering process. For example, it is possible to arrange so that there will appear an ingredient in the first sintering step, between particles of the first sintering powder before complete vanishment of the fibriform vanisher material, to hold the first sintering powder until it is sintered. To achieve this, for example, a slurry which contains the first sintering powder also contains an ingredient that leaves behind such a component as carbon, carbide, etc. between particles of the sintering powder and maintains relative positional relationship between these particles until they are sintered.

The first sintering step of sintering particles of the first powder element may be performed after the fibriform vanisher material has disappeared. Also, as needed, the sintering step may be stopped before the first powder element is sintered, to obtain a porous sintered backing member in which particles of the first powder element are not sintered to each other but are bridged by the second powder element.

The sintered walls may be made by first forming a laminated body of a required shape by laminating a plurality of formed bodies which have undergone the dehydrating-drying step, and then performing the first sintering step for a single time.

Formed bodies which have undergone the dehydrating-drying step hold a sinterable powder on their outer circumferential surfaces of the interlaced fibriform vanisher material. Therefore, it is easy, by fabricating and sintering these formed bodies, to obtain formed bodies of required shapes. It is also possible that a plurality of porous bodies made by interlacing a fibriform vanisher material are assembled first, and then a sintering powder is applied thereto.

Also, the first sintering powder application step may include a plurality of steps for applying different kinds of sintering powders. For example, in cases where powders having very different specific weights must be applied, it is possible to apply these powders uniformly on the outer circumferential surface of the fibriform vanisher material by performing a plurality of sintering powder application steps.

The present application discloses an arrangement that the second sintering powder application step includes: a second impregnation step of impregnating the porous sintered backing member, which has undergone the first sintering step, with a second slurry in which the second sintering powder is dispersed; and a second dehydrating-drying step of dehydrating and/or drying the porous sintered backing member which contains the second slurry, thereby allowing the second sintering powder to be held on surfaces of the sintered walls of the porous sintered backing member.

There is no specific limitation to a dispersion liquid for dispersing the second slurry therein. For example, pure water, isopropyl alcohol, etc. may be used.

The present application discloses an arrangement that a microparticulate pore formation member which has a predetermined particle size is applied, together with the second sintering powder, onto surfaces of the sintered walls of the porous sintered backing member in the second sintering powder application step; and then the pore formation member is vanished in the second sintering step or in a pore formation member vanishing step performed before the second sintering step.

There is no specific limitation to materials, dimensions, shapes, etc. of the microparticulate pore formation member as far as the member can be applied to the surface of the sintered walls together with the second sintering powder. For example, it is desirable that the microparticulate pore formation member has a particle size not smaller than that of the second sintering powder. It is also desirable that the pore formation member vanishes at temperatures not causing the sintered walls to deform in the sintering step or in the pore formation member vanishing step which is performed to vanish the member. The pore formation member is brought to vanished state before the second sintering powder sinters.

The microparticulate pore formation member may be made of a variety of materials as far as it is vanished by the time the sintering of the second sintering powder is completed. Examples include PMMA resin (polymethacrylate), PS resin (polystyrene), PVC resin (polyvinyl chloride), etc.

As disclosed in the present application, the second sintering powder application step may include one, two or more powder application steps for application of at least two different kinds of micro particulate powders including the second sintering powder, onto surfaces of the sintered walls.

These two or more kinds of micro particle powders may be applied in a single powder-application step, or may be applied in a plurality of power-application steps. By forming the sintered microparticulate layer made of a plurality of micro particle powders, it becomes possible to make porous sintered bodies of various kinds of functions. The different kinds of micro particle powders may not only be provided by those which are different in composition, but also may be provided by those of the same composition but differ in dimension or shape.

Often, a resin coat layer is provided on outer circumference of the particles of second sintering powder. The resin coat layer is provided with a mutually repelling electric charge. This ensures dispersion in the slurry. The second sintering powder application step may be performed while applying a predetermined electric charge to the porous sintered backing member. Applying an electric voltage ensures reliable application of the second sintering powder to the surface of the sintered wall. This arrangement also makes it possible to apply two or more kinds of micro particle powders to deposit at different rate, thereby making sintered microparticulate layer having a composition gradient.

As disclosed in the present application, it is desirable that the first sintering powder application step and/or the second sintering powder application step are performed under a vacuum environment by means of impregnating a slurry which contains the sintering powder. This makes it possible to apply a required amount of the first sintering powder to the surface of the fibriform vanisher material, and to apply a required amount of the second sintering powder to an outer circumference of the sintered wall.

There is no specific limitation, either, to the method for performing the second sintering step. For example, as disclosed in the present application, sintering may be performed so that part or all of particles in the second sintering powder which constitutes the sintered microparticulate layer retain at least part of their particle shapes after sintering. Also, as disclosed in the present application, sintering may be performed so that at least part of the particles in the second sintering powder which constitutes the sintered microparticulate layer are melted together without retaining their particle shapes.

In an arrangement which includes two or more second sintering powder application steps, two or more second sintering steps may be performed accordingly to the number of the second sintering powders. By performing a plurality of second sintering steps respectively at sintering temperatures of the two or more second sintering powders, it becomes possible to reliably sinter the second sintering powders.

Advantages of the Invention

The invention makes it possible to obtain porous sintered bodies which have a uniform porosity and desired shapes.

MODE OF EMBODYING THE INVENTION

Figure 1:
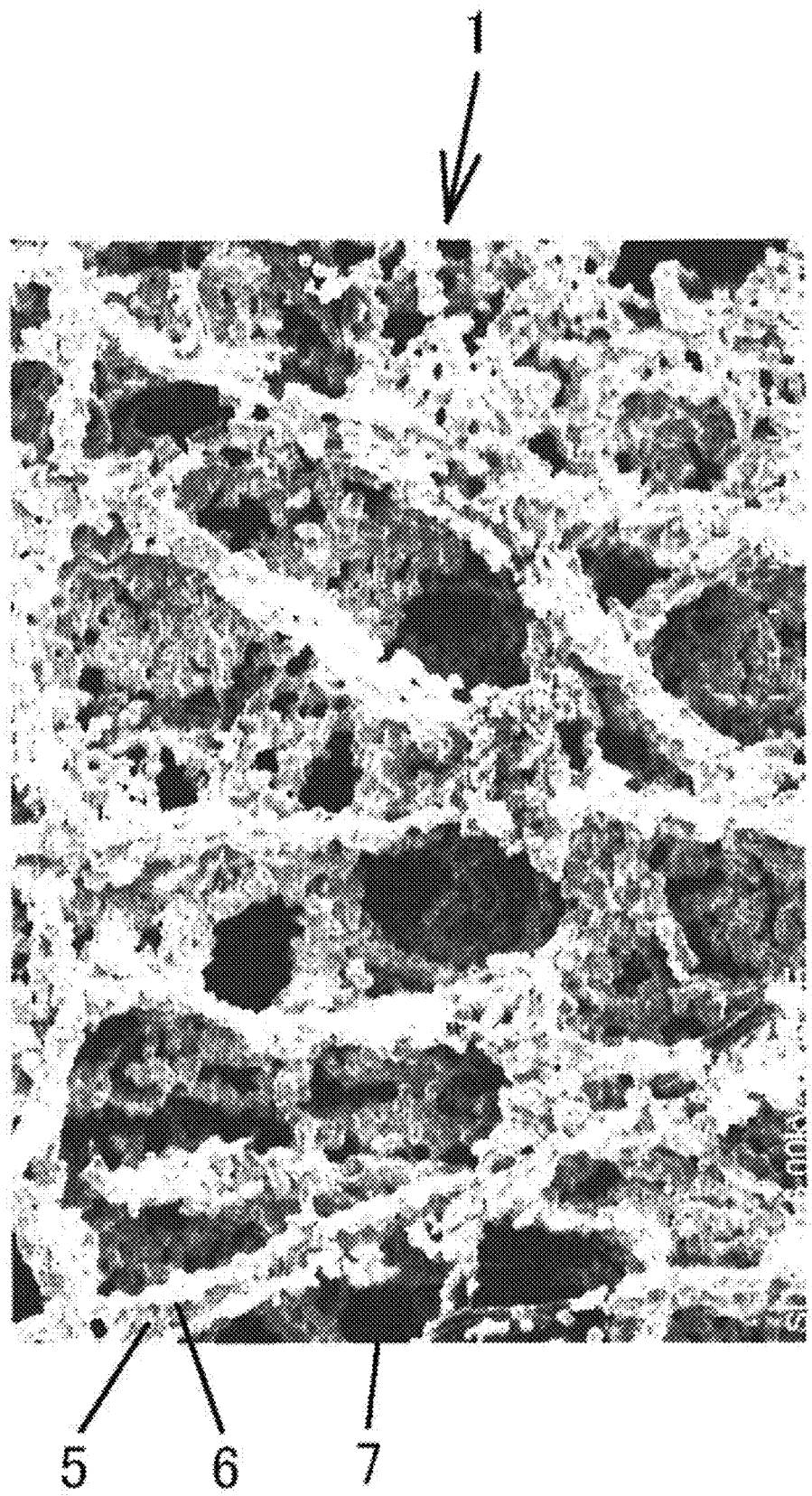
FIG. 1 is an electron micrograph showing an example of porous sintered body according to the present invention.

Hereinafter, embodiments according to the present invention will be described specifically, based on the drawings. FIG. 1 is an electron micrograph showing an example of a the porous sintered backing member 1 according to the present invention. The embodiment is an application of the present invention to a porous sintered body which includes a porous sintered backing member made from a stainless steel powder.

Figure 2:
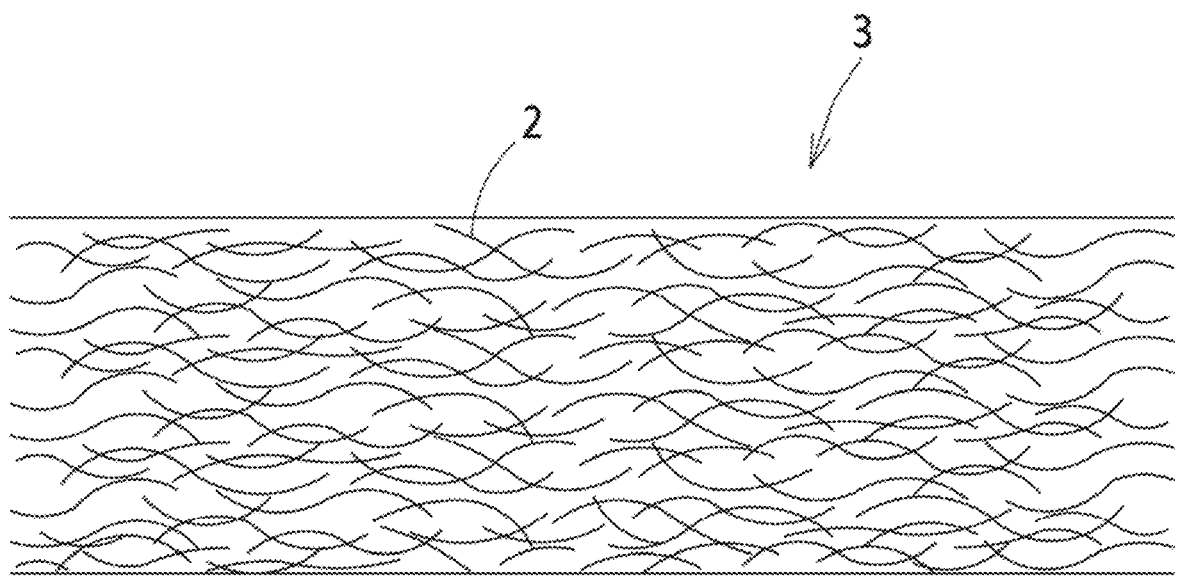
FIG. 2 is diagrammatic illustration of a sheet-like formed body formed from a fibriform vanisher material.

The porous sintered backing member 1 is made of a sintered walls 6 along an outer circumferential surface of an interlaced fibriform vanisher material. As shown in FIG. 2, the porous sintered backing member 1 according to the present embodiment is made by interlacing a fibriform vanisher material 2 into a predetermined form, i.e., into a porous body 3, then having the vanishing material's outer circumferential region hold a first sintering powder and then sintering the powder. In FIG. 2, the fibriform vanisher material 2 is made from a short-fiber and this material is interlaced to form the porous body 3. However, a continuous fiber may be interlaced or otherwise structured into a sheet-like porous body.

Figure 3:
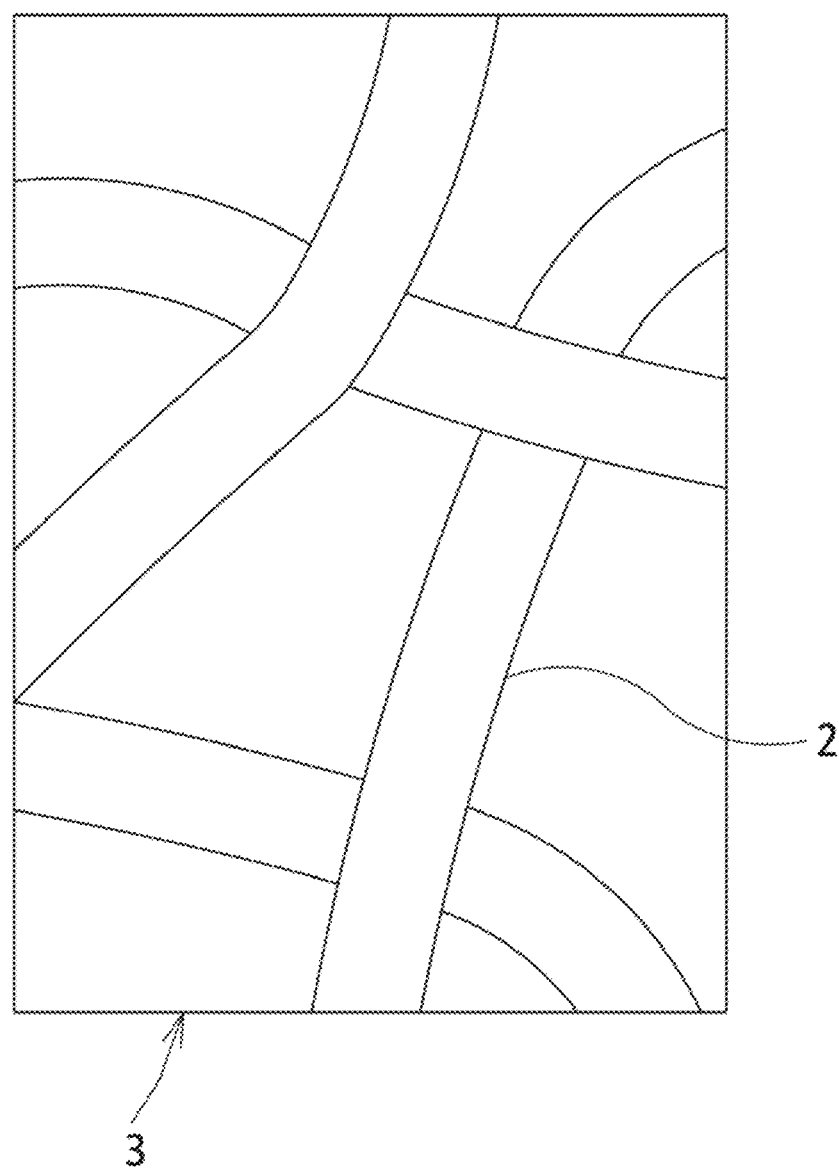
FIG. 3 is an enlarged illustration of a primary portion, rendering how the fibriform vanisher material is interlaced.
Figure 4:
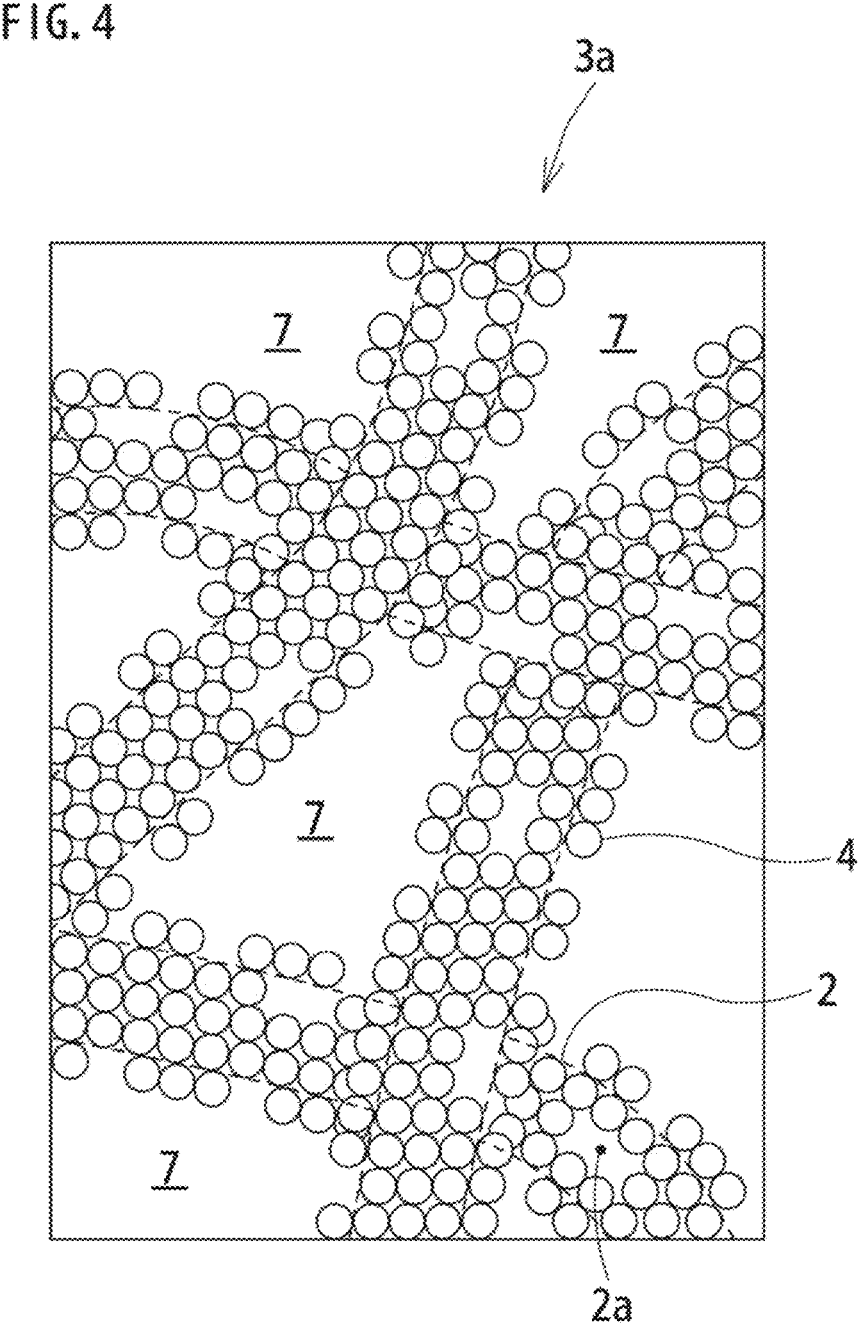
FIG. 4 is an illustration, rendering an outer circumferential region of the fibriform vanisher material in FIG. 3 holding a first sintering powder.

FIG. 3 is a partial, enlarged illustration, rendering a state of the interlaced fibriform vanisher material 2. Also, FIG. 4 is an illustration, rendering a state in which the first sintering powder 4 is held on the outer circumferential surface of the fibriform vanisher material 2. In the present embodiment, the outer circumferential surface of the fibriform vanisher material 2 is coated with one through three laminated layers of the first sintering powder 4. For the sake of easier understanding, FIG. 4 illustrates only one layer of the first sintering powder consisting of ball-shaped particles of a uniform diameter.

In reality, it is not necessary that there is a uniform lamination of the first sintering powder 4 on all regions; rather, it is acceptable if there are regions not covered by the first sintering powder 4.

Figure 5:
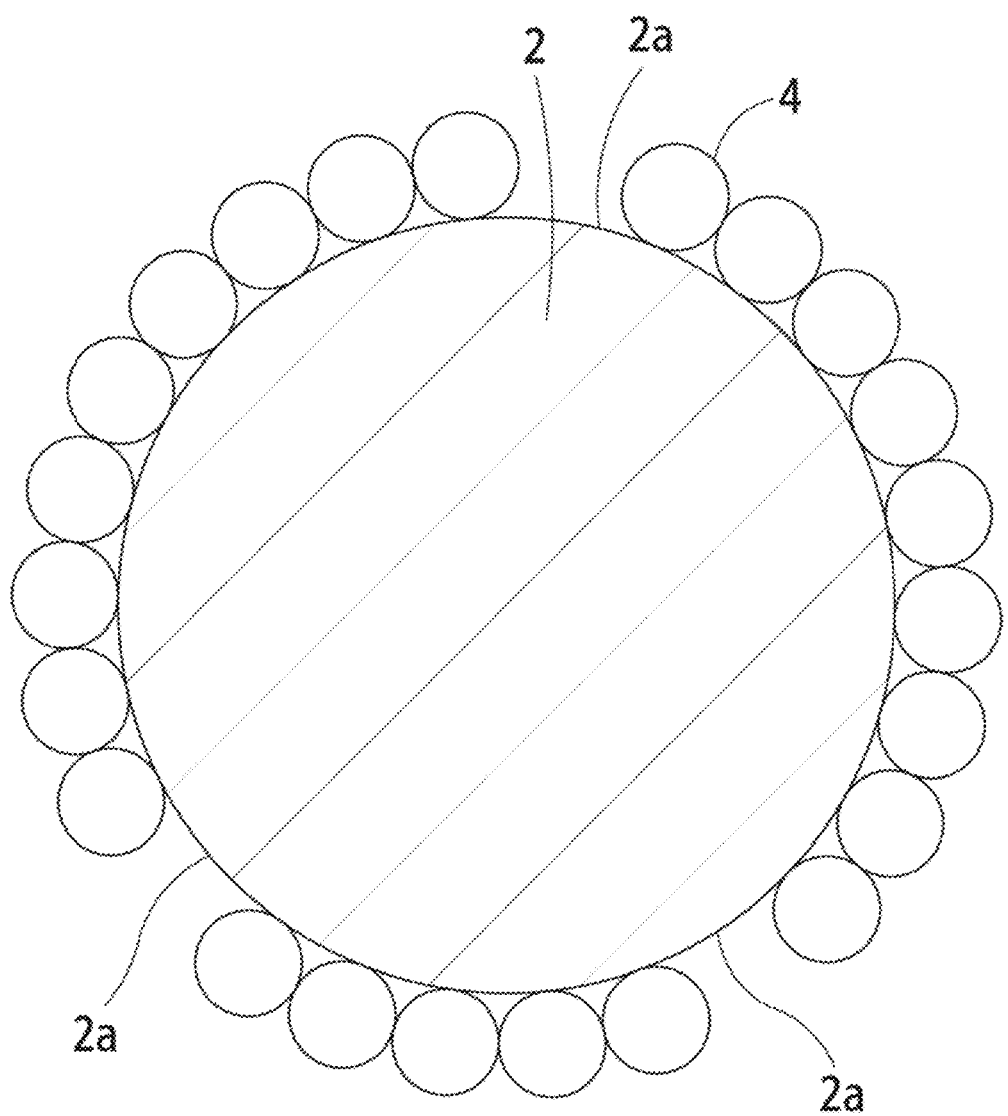
FIG. 5 is an illustration, rendering a section of the fibriform vanisher material having its outer circumferential region holding the first sintering powder.

FIG. 5 is an illustration, rendering a section, which is vertical to an axis of the fibriform vanisher material 2 that holds the first sintering powder. As shown in this figure, the first sintering powder 4 is held along the outer circumferential surface of the fibriform vanisher material 2. Although FIG. 5 illustrates the fibriform vanisher material 2 and the first sintering powder 4 as having circular sections, this is not limiting. There is no limitation, either, on the relative sizes of the fibriform vanisher material 2 and the first sintering powder 4. Any size is acceptable as far as a plurality of powder particles can be held along an outer circumferential surface of the fibriform vanisher material.

Figure 6:
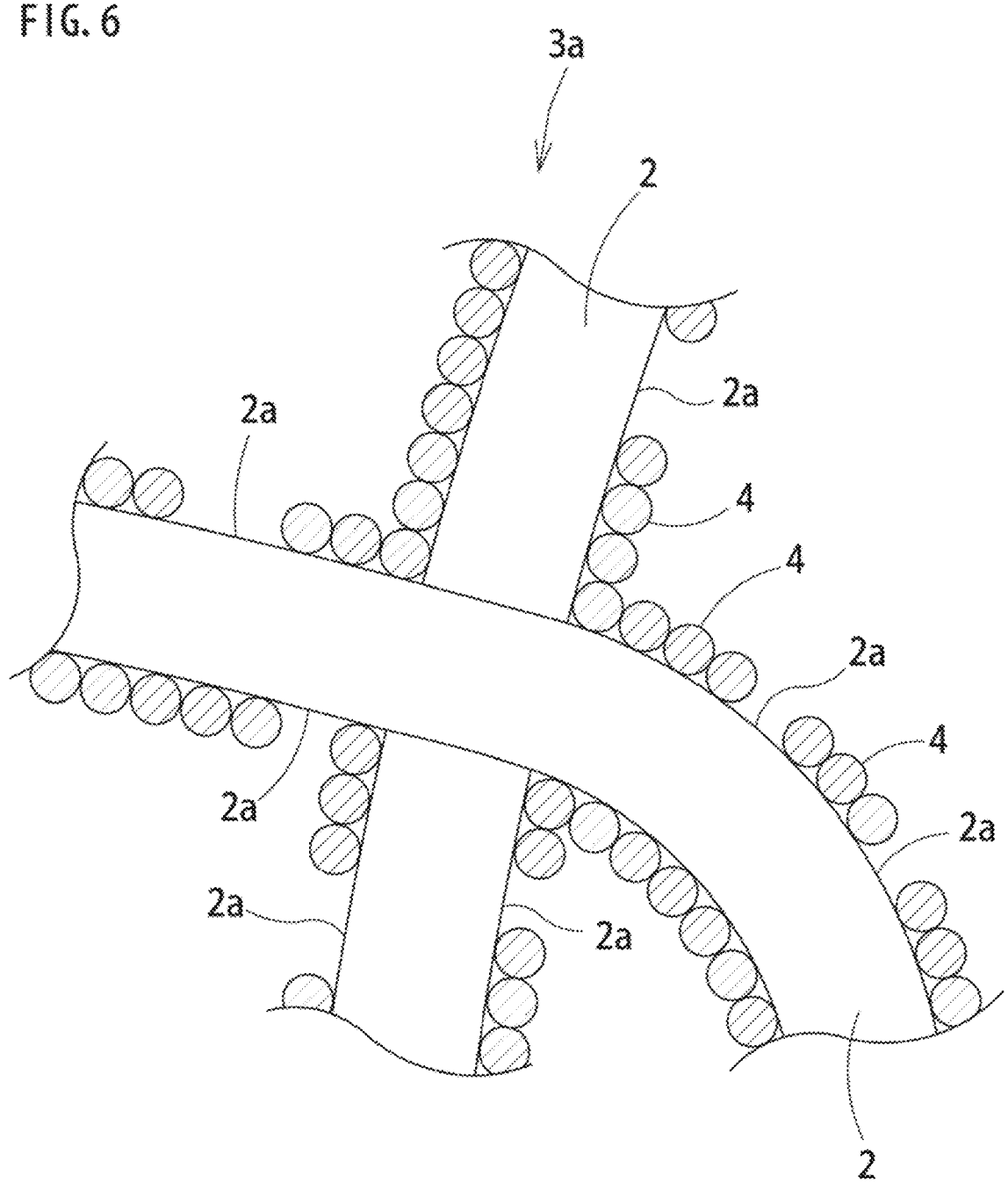
FIG. 6 is an enlarged illustration of a primary portion, rendering an axial section of the fibriform vanisher material in FIG. 5.

FIG. 6 illustratively shows an axial section of the fibriform vanisher material 2. As shown in this figure, the first sintering powder 4 is held along the outer circumferential surface of the fibriform vanisher material 2 while there are certain regions 2a which do not hold the first sintering powder 4.

As a porous body 3a, which is loaded with the first sintering powder 4 on the outer circumferential surface of the fibriform vanisher material 2, is heated, the fibriform vanisher material 2 vanishes and mutually adjacent particles of the first sintering powder 4 are sintered to each other.

Figure 7:
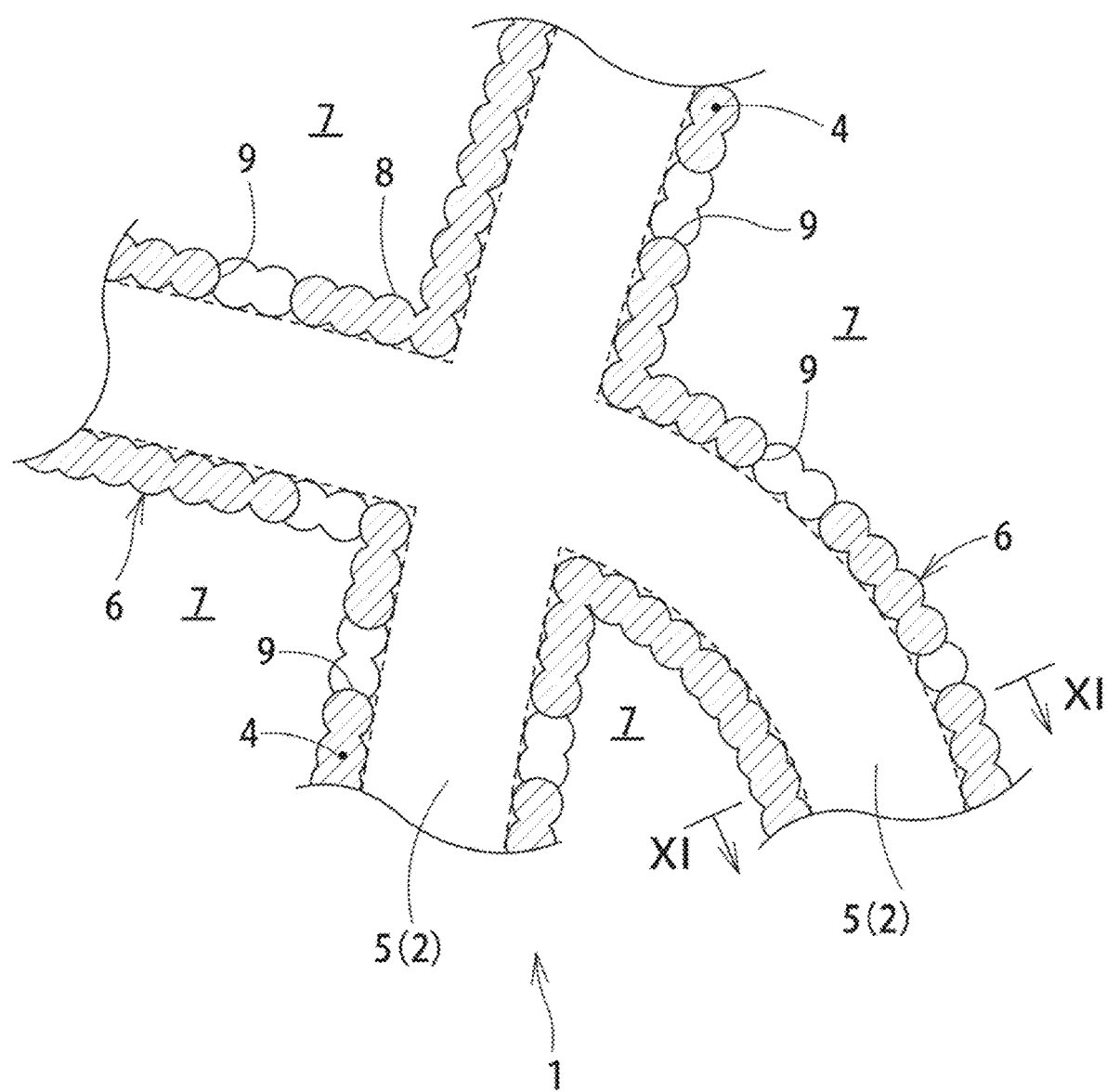
FIG. 7 is an enlarged illustration of a primary portion, rendering a state that the fibriform vanisher material shown in FIG. 6 has been vanished and the first sintering powder is sintered.

In the present embodiment, settings are made for heating temperature and time so that mutually adjacent powder particles will be necking-sintered as shown in FIG. 7. The mutually adjacent particles of the first sintering powder 4 become bonded to each other at their places of mutual contact, while each powder particle in the first sintering powder 4 still retains part of its outer form. In the necking sintering, mutually adjacent powder particles are bonded by way of diffused junction at lower temperatures than temperatures at which fusion sintering take place in the first sintering powder 4. Therefore, even in cases where the fibriform vanisher material 2 varnishes at temperatures lower than a melting temperature of the first sintering powder 4, it is possible to keep the first sintering powder 4 in a shape that follows the outer circumferential surface of the fibriform vanisher material 2 while continuing with the sintering.

FIG. 7 shows a porous sintered backing member 1, which includes hollow cores 5 having a shape of the interlaced fibriform vanisher material 2 that has been vanished; sintered walls 6 formed by sintering the first sintering powder 4 around the cores 5; and voids 7 between the sintered walls 6.

In the present embodiment, the sintered walls 6 have their surfaces provided with corrugations 8 following the shape of particles of the powder 4 as a result of necking sintering performed to the first sintering powder 4. Also, the regions 2a in FIG. 5, where there was no first sintering powder 4 present on the outer circumferential region of the fibriform vanisher material 2, are turned into absent regions 9. The sintered wall 6 as a whole is cylindrical, following the outer circumferential surface of the fibriform vanisher material 2, with the absent regions 9 scattering all over, having a structure that hollow cores 5 and voids 7 communicate with each other via absent regions 9.

The void 7 substantially follows the shape of the porous body 3 which is formed from the fibriform vanisher material 2 since the porous sintered backing member 1 is provided by the sintered walls 6 made by sintering one through three layers of the first sintering powder 4 held on an outer circumferential surface of the fibriform vanisher material 2. Further, since the sintered walls 6 are provided by a combination of the cores 5 and the voids 7 which communicate with each other via the absent regions 9, voids are formed on both inside and outside of the sintered walls 6. Therefore, it is possible to obtain a porous sintered backing member 1 which has a greater porosity than that of a porous body 3 which is formed by interlacing the fibriform vanisher material 2. Also, since both of the inside and the outside of the sintered walls 6 provide working surfaces, it is possible to make a porous sintered backing member 1 which has a very large surface area inside.

Also, through the necking sintering of the first sintering powder 4, corrugations 8 are formed on surfaces of the sintered walls 6, which further increases the surface area of the porous sintered body. Further, since part of the shape of the first sintering powder 4 is retained, it becomes also possible to decrease the amount of shrinkage at the time of sintering, making it possible to obtain a porous sintered backing member 1 of increased accuracy in the form and dimensions.

In the present embodiment, Kozo (*Broussonetia kazinoki×B. papyrifera*) fiber of an approximate diameter of 20 µm and an average fiber length of 5 mm was used to form a sheet-like porous body which had a thickness of approximately 20 µm, with a wet papermaking method. There is no specific limitation to the material or the shape of the fibriform vanisher material 2 as far as the vanisher material vanishes by the time when sintering of the first sintering powder 4 is completed. Examples include not only natural fibers from Mitsumata (*Edgeworthia chrysantha*), Kozo (*Broussonetia kazinoki×B. papyrifera*), etc. but also artificial fibers such as polyester, polyethylene, rayon and acrylic; and pulp as well. There is no specific limitation to the diameter or the length of the fiber, as far as it is possible to interlace the fiber into a porous body of a desired shape. For example, the formed body may be formed of an endless fiber produced from electrospinning, etc. Also, even in cases where the fibriform vanisher material 2 vanishes before the first sintering powder 4 starts melting and begins sintering, it is possible to proceed with the sintering of the first sintering powder 4 while keeping the outer shape of the fibriform vanisher material 2, because a temperature at which diffused junction takes place in the first sintering powder 4 is lower than the melting temperature and therefore.

There is no specific limitation, either, to the forming process of forming the porous body 3a from the fibriform vanisher material 2. For example, wet papermaking method can be employed to form sheet-like porous bodies. Also, needle punching and other non-woven fabric making methods may be used to provide porous bodies. Further, porous bodies may be provided in a three-dimensional manner by using air streams, for example, when interlacing fibers. By selecting appropriate dimensions and shapes for the fibriform vanisher material 2, and mode of interlacing, it is possible to obtain porous bodies of predetermined dimensions and shapes. It is also possible to use cloth-like porous bodies made by weaving or other methods.

In the present embodiment, the porous body 3a is formed from the fibriform vanisher material 2, and the first sintering powder 4 is held on the outer circumferential surface of the fibriform vanisher material 2 while it is sintered. Therefore, it is possible not only to obtain porous sintered backing members 1 of various shapes but also to achieve a uniform porosity over all regions of the porous sintered backing member 1. For example, it is now possible to make a series of porous sintered bodies, from a very thin sheet-like porous sintered body to a thick, three-dimensional porous sintered body, of a uniform porosity and predetermined shapes.

There is no specific limitation to material from which the first sintering powder 4 is made. Examples of the materials include metals such as iron, nickel and copper, but also ceramic powders as well. Also, two or more powder materials may be mixed to produce the powder. For example, in cases where a ceramic powder, which has a high sintering temperature, is employed, the first sintering powder may be a blend with a metal, for example, which has a lower sintering temperature. This makes it possible to ensure shape retention until the fibriform vanisher material sinters. Further, the powder may be made of a mixture of a sintering powder and a non-sintering powder. In the present embodiment, particles of the first sintering powder are bonded to each other by necking sintering, so it is possible to sinter while retaining all surface characteristics of each powder. Thus, by using a mixed powder which contains a powder having catalyser capabilities, it is possible to obtain a porous sintered body which has high catalyser capabilities.

In the present embodiment, the first sintering powder 4 is provided by a stainless steel powder which has an average particle size of 3 µm, to form sintered walls 6 which has an approximate thickness of 10 µm. It is preferable that the first sintering powder has an average particle size of 0.5 µm through 30 µm, and the sintered walls 6 has a thickness of 0.5 µm through 50 µm. It is preferable, however, that the particle is of a size which can be arranged and held in a sinterable manner around the fibriform vanisher material 2. For example, the first sintering powder 4 should have an average particle size of 1/5 through 1/50 of the diameter of fibriform vanisher material 2. If the first sintering powder 4 has a particle size which is greater than 1/5 of the diameter of the fibriform vanisher material 2, it becomes difficult to hold the first sintering powder 4 around the fibriform vanisher material 2. On the other hand, if the first sintering powder 4 has a particle size which is smaller than 1/50 of the diameter of the fibriform vanisher material 2, it becomes impossible to retain the form or achieve strength during and/or after sintering.

There is no specific limitation, either, to a first sintering powder application step in which outer circumferential regions of the fibriform vanisher material 2 is caused to hold the first sintering powder 4. For example, it is possible to have the outer circumferential regions of the fibriform vanisher material 2 hold the first sintering powder 4 by first interlaying a fibriform vanisher material into a porous body 3a and then impregnating it with a slurry, etc. which contains the first sintering powder 4. For example, a metal powder is dispersed at a predetermined concentration in an aqueous solution of a binder such as carboxymethyl cellulose. Then, the porous body 3a formed of the fibriform vanisher material 2 is soaked into the solution, and thereafter, dehydrated or naturally dried. With this method it is possible to obtain a porous body which holds the first sintering powder 4 on the outer circumferential region of the fibriform vanisher material 2. By adjusting powder concentration, soaking time, etc. in the first sintering powder application step, it is possible to adjust the amount of the first sintering powder applied.

Also, if wet papermaking method is used to forma sheet-like porous body, the first sintering powder 4 may be added to a slurry which contains the fibriform vanisher material 2, whereby it becomes possible to interlace the fibriform vanisher material and to make the powder held by the outer circumferential region of the fibriform vanisher material 2, simultaneously.

The fibriform vanisher material according to the present embodiment is made from Kozo (*Broussonetia kazinoki×B. papyrifera*), and is vanishable when heated to a temperature of approximately 500 degrees Celsius in the vanishing material vanishing step. The first sintering powder 4, on the other hand, is brought to necking sintering by heating to an approximate temperature of 800 degrees Celsius in a first sintering step. The first sintering powder particles start bonding byway of diffused junction by the time the vanishing material vanishing step is completely finished. Therefore, the first sintering powder sinters along an outer circumferential shape of the fibriform vanisher material. It should be noted here that even if the fibriform vanisher material 2 loses its shape, the fibriform vanisher material 2 leaves behind some residue components, such as carbon, carbide, etc. These will remain among particles of the first sintering powder 4 and help shape retention, so the first sintering powder 4 is maintained in the shape along the outer circumferential surface of the fibriform vanisher material 2 while bonding continues by way of diffused junction even at temperatures above 500 degrees Celsius. The vanishing material vanishing step and the first sintering step may be performed as a continuous process or as separate processes. It should be noted here that the temperature for the vanishing material vanishing step and for the first sintering step are selected according to the materials to be used.

In the porous sintered body according to the embodiment described above, the first sintering powder 4 is applied on most of the outer circumferential region of the fibriform vanisher material 2 and then sintering follows. However, it is also possible as shown in FIG. 8 and in FIG. 9, to form a porous sintered backing member 100 by applying the first sintering powder 24 onto part of an outer circumferential region of a fibriform vanisher material 22.

Figure 8:
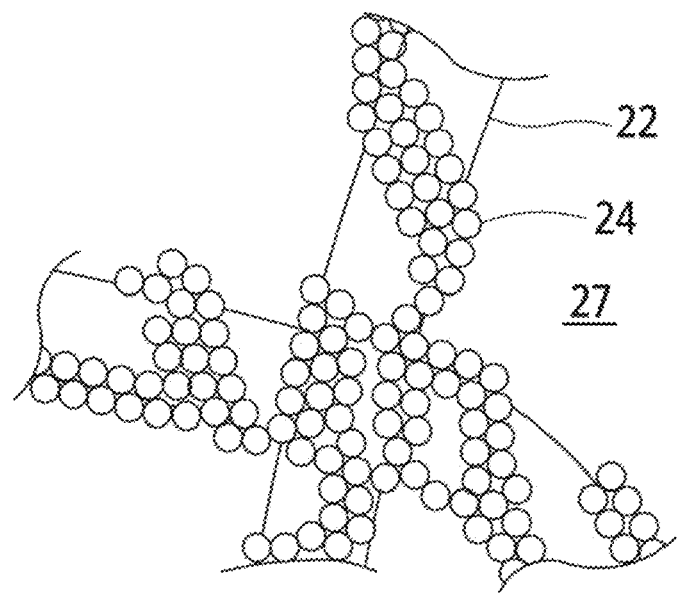
FIG. 8 shows a second embodiment, rendering an outer circumferential region of a fibriform vanisher material holding the first sintering powder.
Figure 9:
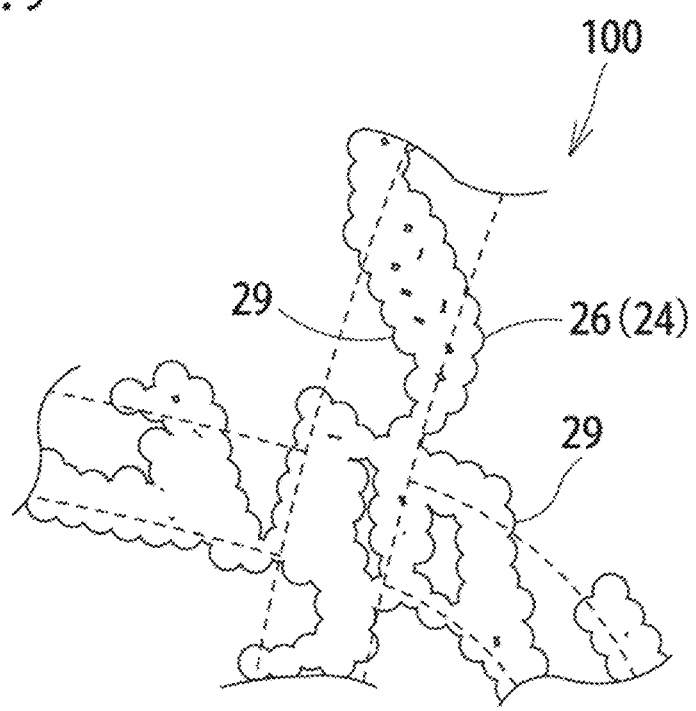
FIG. 9 is an illustration, rendering a sintered state of the first sintering powder shown in FIG. 8.

Specifically, even if the first sintering powder 24 is applied only partly on the fibriform vanisher material 22 as shown in FIG. 8, it is possible to form the porous sintered backing member 100 as far as powder particles are sufficiently adjacent to each other for necking sintering. Also, in this case, mutually adjacent particles of the first powder 24 agglutinate with each other in the process in which the fibriform vanisher material 22 vanishes, and for this reason, it is possible to make the porous sintered backing member 100 which has a high ratio of absent regions 29 formed on sintered walls 26 as shown in FIG. 9.

Figure 10:
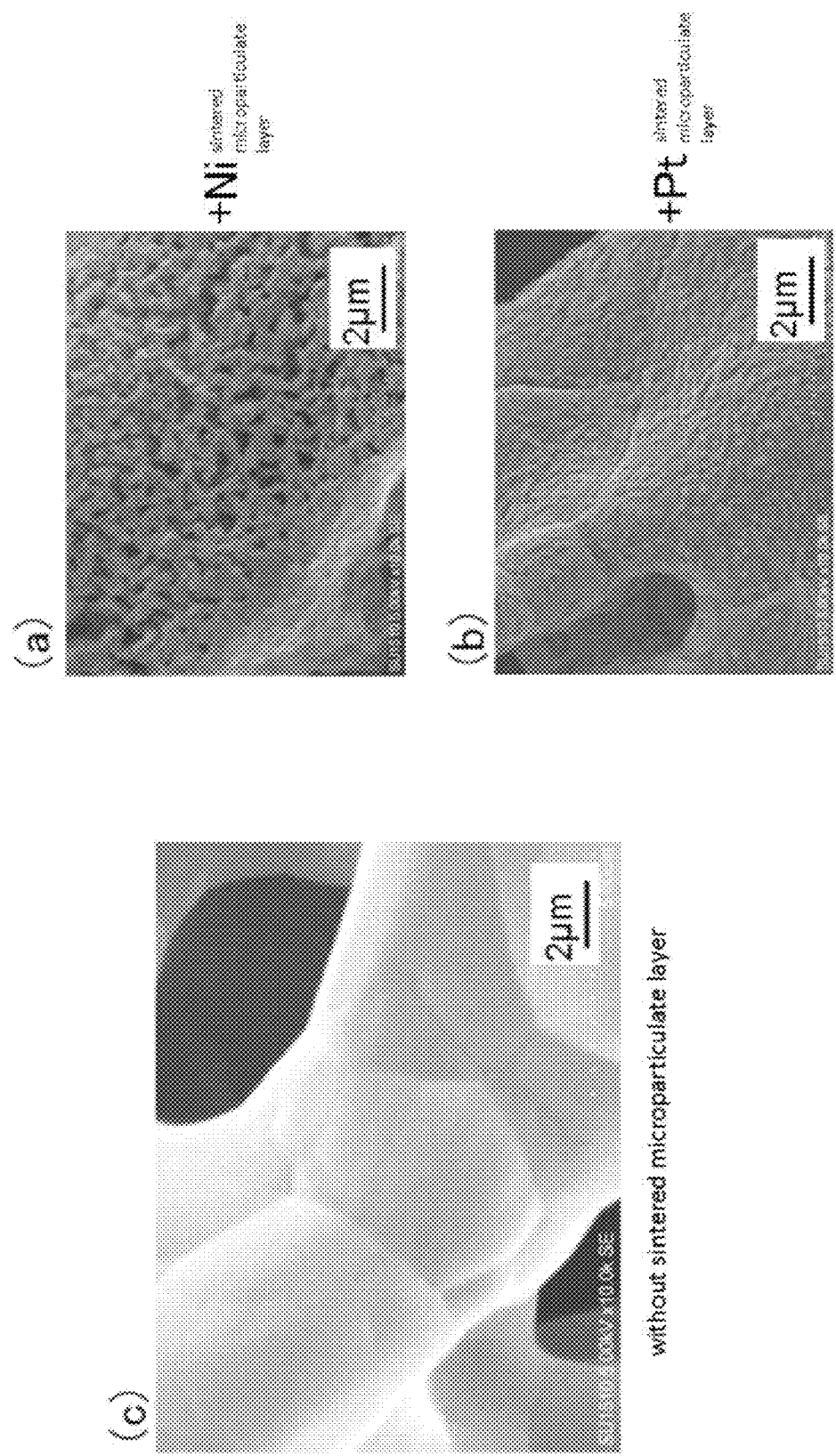
FIG. 10(a) is a micrograph of a sintered wall formed with a sintered microparticulate layer having airspace.
FIG. 10(b) is a micrograph of a sintered wall formed with a sintered microparticulate layer which does not have airspace.
FIG. 10(c) is a micrograph showing a state of a surface of a sintered wall which is not formed with a sintered microparticulate layer.

FIG. 10 includes a micrograph showing a surface state of the porous sintered backing member 1, and a micrograph showing a case where a sintered microparticulate layer is formed. FIG. 10(*c*) shows a surface of the porous sintered backing member 1 which is not formed with the sintered microparticulate layer. On the other hand, FIG. 10(*a*) shows a surface of a sintered microparticulate layer formed on a surface of the porous sintered backing member 1. The layer has a thickness of 900 nm, and is made of Ni micro particles having an average particle size of 300 nm. FIG. 10(*b*) shows a surface of a sintered microparticulate layer formed on a surface of the porous sintered backing member 1. In this case, however, the layer is formed in a sporadic fashion, has a thickness of 30 through 100 nm, and made of Pt micro particles having an average particle size of 30 nm.

From FIG. 10(*a*) and FIG. 10*b*, it is understood that a sintered microparticulate layer formed on the surface of the porous sintered backing member 1 has pores and corrugations formed in the surface, resulting in increase in the surface area. Also, from FIG. 10(*a*), it is understood that there is formed a large number of crack-like pores. Hereinafter, description will cover methods of forming the sintered microparticulate layer.

Figure 11:
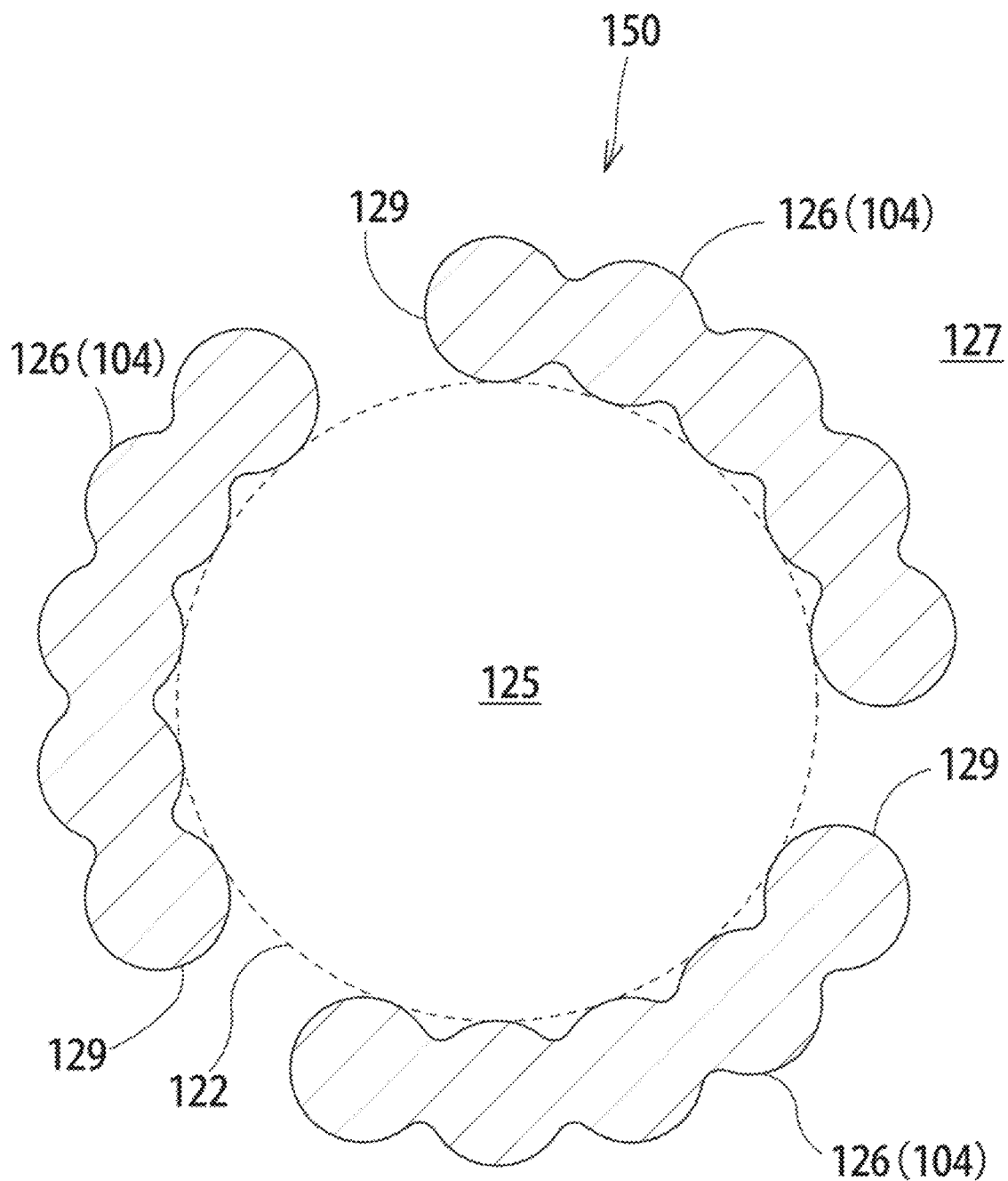
FIG. 11 is an illustrative sectional view, rendering a section of a sintered wall.

FIG. 11 is a rendering to show a section of a porous sintered backing member 150 which is taken vertically to an axis of a sintered wall 126. The sintered wall 126 is formed by means of necking sintering of a first sintering powder 104 which is disposed around a fibriform vanisher material 122 that is vanished in the manufacturing process. A hollow core 125 and a void 127 communicate with each other via absent regions 129.

In the present embodiment, a second sintering powder application step is performed in which a second sintering powder 124 smaller in diameter than the first sintering powder 104 is applied on a surface of the sintered wall 126.

There is no specific limitation to materials for, or shapes of the second sintering powder 124. For example, micro particles having catalyser functions, made of Ni, Pt, etc., can be utilized. There is no specific limitation, either, to dimensions. It is preferable, however, to use so called nano particles which have a particle size ranging from 20 nm through 1000 nm for example. Nano particles have sintering temperatures lower than those for forming the sintered walls 126. Therefore, it is possible to form sintered microparticulate layers without altering the shape of the sintered wall 126. In addition, since the sintered wall 126 has a very large surface area, it is possible to have a large amount of the second sintering powder 124 held on surfaces of the sintered wall 126.

The second sintering powder 124 may be made by various methods. For example, micro particles prepared by a solid-phase synthesis method, a liquid-phase synthesis method and gas-phase synthesis method are usable. It is preferable that the second sintering powder 124 is dispersible in liquid in order to cover surfaces of the sintered wall 126. It is therefore preferable for example, that particles of the second sintering powder 124 has its outer circumferential surface coated with a layer of an appropriate kind so that the particles will repel against each other and disperse in the liquid.

There is no specific limitation, either, to the method for applying the second micro particles 124 to the surfaces of the sintered wall 126. It is desirable, however, that the second sintering powder application step is performed by dispersing the second sintering powder 124 in a slurry and soaking the porous sintered backing member 150 into the slurry.

There is no specific limitation, either, to ingredients of the slurry, so they may be selected accordingly to the material from which the second sintering powder 124 is formed, or the shape thereof. Examples of usable solvent include pure water, isopropyl alcohol, and ketone, but many other kinds of liquid can also be used as the dispersion liquid for the slurry solvent. The embodiment shown in FIG. 10(*a*) FIG. 10(*b*) uses isopropyl alcohol as a base of the slurry.

There is no specific limitation, either, to the mode of dispersion in the slurry. For example, clusters composed of a plurality of micro particles may be in a dispersed state while keeping a predetermined size of the clusters. It is also acceptable that plural kinds of the second sintering powders are contained in the slurry. Further, the slurry may contain other ingredients than the second sintering powder. For example, the second sintering powder and micro particles for forming microparticulate pores may be contained in the slurry. Also, a slurry may contain micro particles which have a high sintering temperature, such as titanium dioxide, and a metal which is highly sinterable.

The above-described porous sintered backing member 150 has extremely small pores and corrugations, so it can be difficult to distribute the slurry on the entire surface of the sintered wall 126 by a simple dipping operation. For this reason, it is desirable that a vacuum environment is employed when performing the second sintering powder application step of perfusing the slurry which contains the second sintering powder. This makes it possible to apply the second sintering powder to the entire outer circumferential surface of the sintered wall 126.

Figure 12:
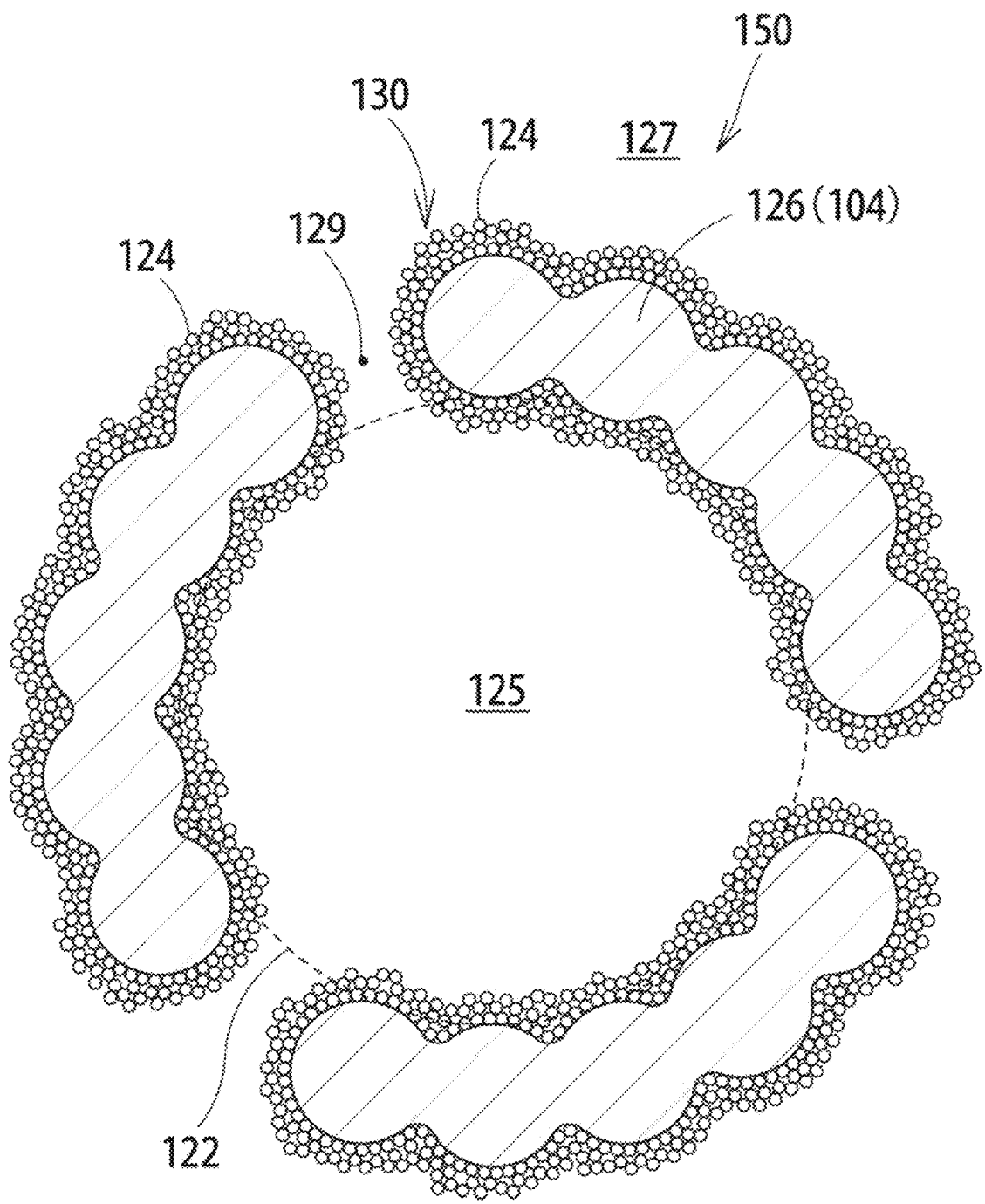
FIG. 12 is an illustrative sectional view, rendering a state that the sintered shown in FIG. 11 has its wall holding a second sintering powder.

There is no specific limitation to, e.g., a thickness of the second sintering powder 124 applied. For example, incases where the second sintering powder is provided by a micro particle having catalyser functions such as Pt, then the thickness may be made small in order to reduce the amount of catalyser to be used thereby reducing cost of manufacture. It should be noted here that FIG. 12 and the following drawings somewhat exaggerates the size of the second sintering powder 124 and the thickness of the layer made thereby for easier understanding.

Once the second sintering powder 124 is applied on the porous sintered backing member 150, the second sintering step is performed. The second sintering step is performed at temperatures at which the second sintering powder 124 sinters. Since the second sintering powder 124 is provided by so called nano particles, a lower sintering temperature can be used. For example, in a case of forming the sintered microparticulate layer of Ni shown in FIG. 10(a), a sintering temperature of 800 degrees Celsius is sufficient to perform the second sintering step. For the micro particles of Pt shown in FIG. 10(b), a temperature of 600 degrees Celsius is sufficient to sinter successfully.

By setting this temperature which is applied in the second sintering step at a lower temperature than the temperature for the first sintering step, it becomes possible to eliminate a risk of deforming the porous sintered backing member 150. In other words, the arrangement makes sure to form the sintered microparticulate layer while maintaining the shape of the sintered walls 126.

As has been mentioned earlier, micro particles such as nano particles are very small in particle size, so when they are used as the second sintering powder 124, it is difficult to disperse the raw micro particles as they are, in a liquid. For this reason, a very thin layer of resin coat, for example, is often provided on surfaces of the micro particles. The resin coat layer is electrically charged, for example, to repel each other, so that the micro particles are kept dispersed in the liquid.

Figure 13:
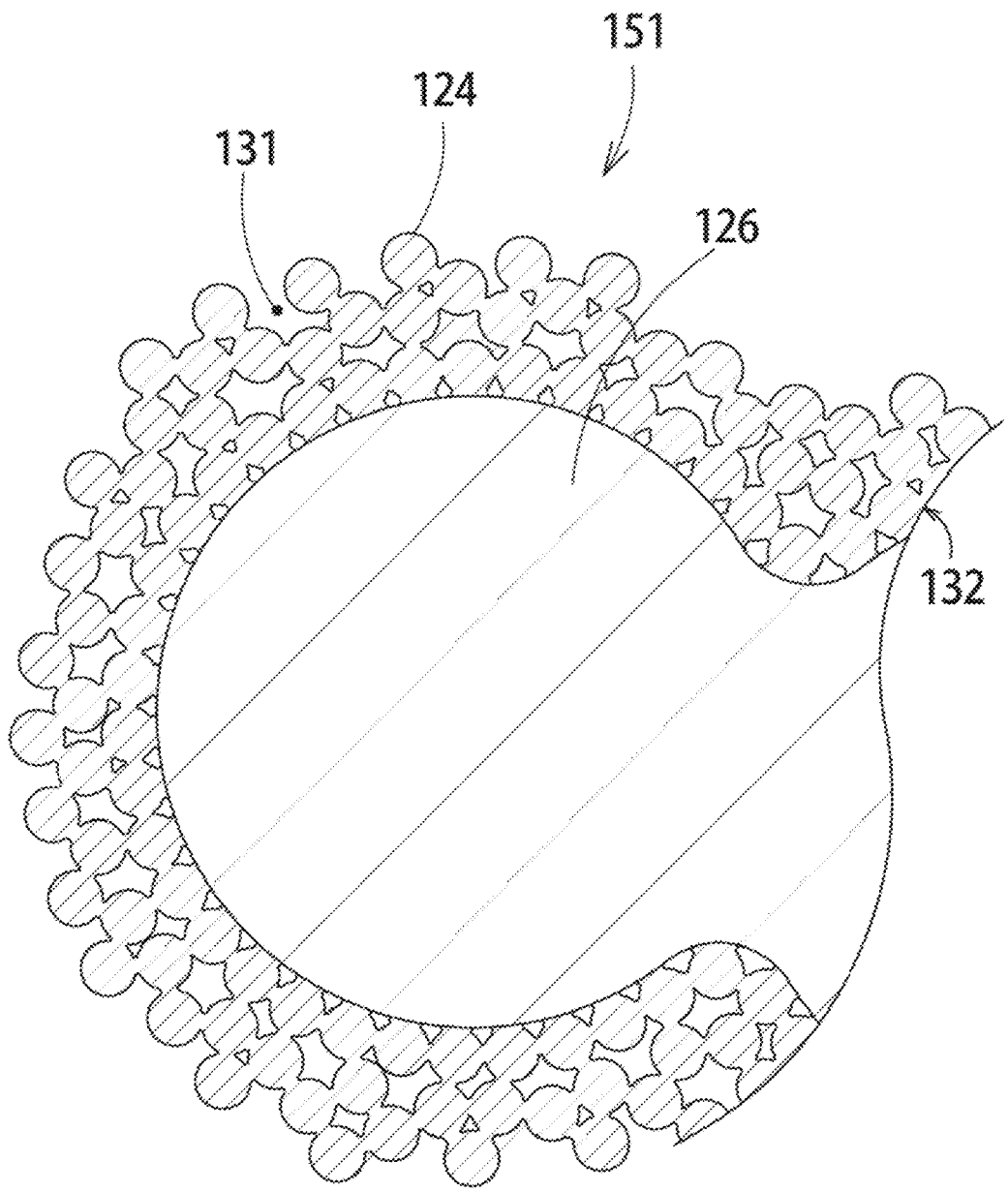
FIG. 13 is an enlarged illustrative sectional view on, rendering a sintered state of the first sintering powder shown in FIG. 12.
Figure 22:
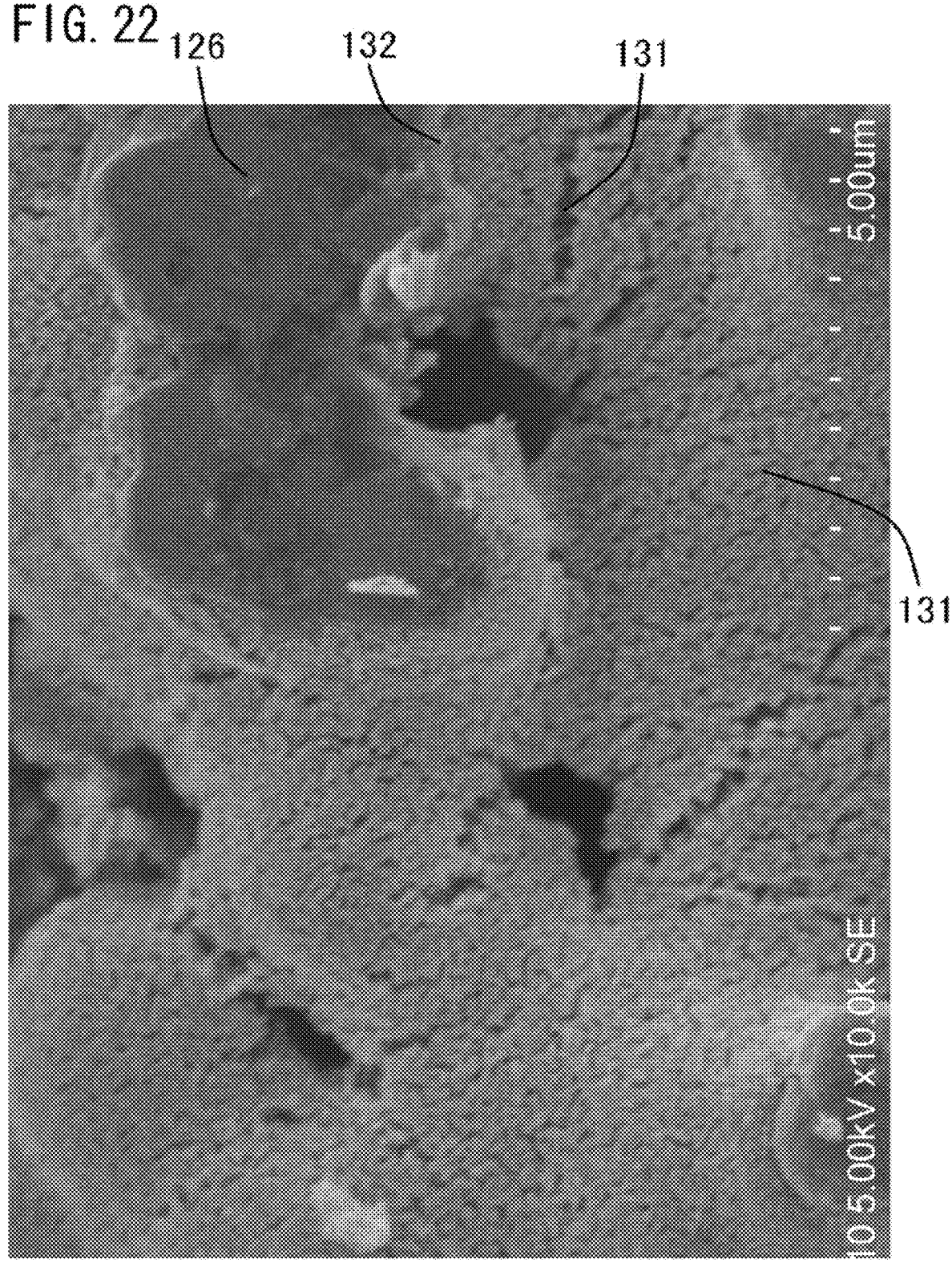
FIG. 22 is a micrograph, showing a surface state of a sintered microparticulate layer having airspace.

The second sintering powder 124 as applied onto the surface of the porous sintered backing member 126 is spaced therefrom by a distance at least equal to the thickness of the resin coat layer, i.e., without making direct contact thereto. For this reason, when the resin coat layer vanishes or when the second sintering powder sinters, mutually adjacent micro particles move to come closer and bond to each other, consequently to form a countless number of crack-like or wrinkle-like pores 131 around these groups of mutually-bonded micro particles as shown in FIG. 10 (a), FIG. 13 and FIG. 22. Often, these pores 131 have an average diameter of at least a fifth through a hundred times of the diameter of the second sintering powder 124. The pores 131 appear more significantly if necking sintering is performed to the second sintering powder 124. Further, because the sintered walls 26 have their surfaces covered with corrugations which have extremely complicated and irregular shapes, and because it is extremely difficult to form layers in which particles are arranged in a regular manner following the irregular corrugations, it is very likely that the particles will distribute at different densities following the corrugation, and this promotes formation of the pores. As a result, it is possible to make the sintered microparticulate layer 132 as a porous body as shown in FIG. 13, and to dramatically increase the surface area of a porous sintered body 151. Also, it is possible to adjust the size of the pores 131 by adjusting the thickness of the resin coat layer of the second sintering powder 124, the amount thereof to be applied onto the sintered walls 126, etc.

In the embodiment shown in FIG. 10(b), micro particles of Pt is used in a reduced amount, so that the micro particles are applied in a sporadic fashion, so that the sintered layer does not have such cracks (pores) as seen in FIG. 10(a). As understood, it is possible to adjust the amount and size of the pores by adjusting the particle size and the amount of application of the second sintering particles.

Figure 14:
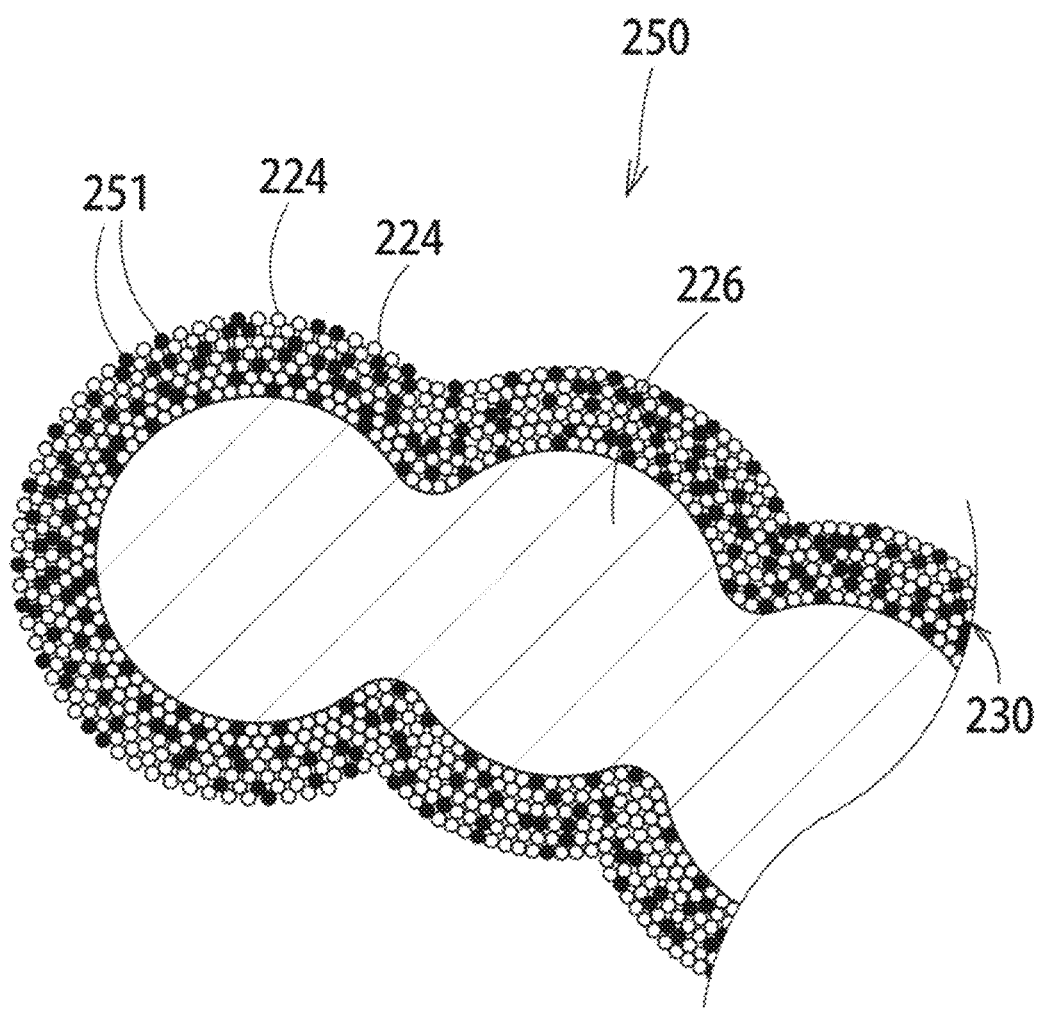
FIG. 14 is an illustrative sectional view, rendering a state that the second sintering powder blended with a microparticulate pore formation member is held on a sintered wall.

FIG. 14 is an illustrative sectional view, rendering a state where a mixture of the second sintering powder 224 (represented by white circles) and a microparticulate pore formation member 251 (represented by black circles) are applied on a surface of a sintered wall 226. In the present embodiment, the second sintering powder 224 and the microparticulate pore formation member 251 are illustrated in the same dimension and shape. However, the second sintering powder and the microparticulate pore formation member may have different dimensions and/or shapes from each other.

The second sintering powder 224 and the microparticulate pore formation member 251 are applied onto the surface of the sintered walls 226 using the same method as used in the second sintering powder application step. The microparticulate pore formation member 251 is provided by one which is dispersible together with the second sintering powder 224 in a liquid, and is desirably made of a material which vanishes at temperatures lower than the sintering temperature of the second sintering powder 224. Examples include PMMA resin (polymethacrylate), PS resin (polystyrene), PVC resin (polyvinyl chloride), etc.

Figure 15:
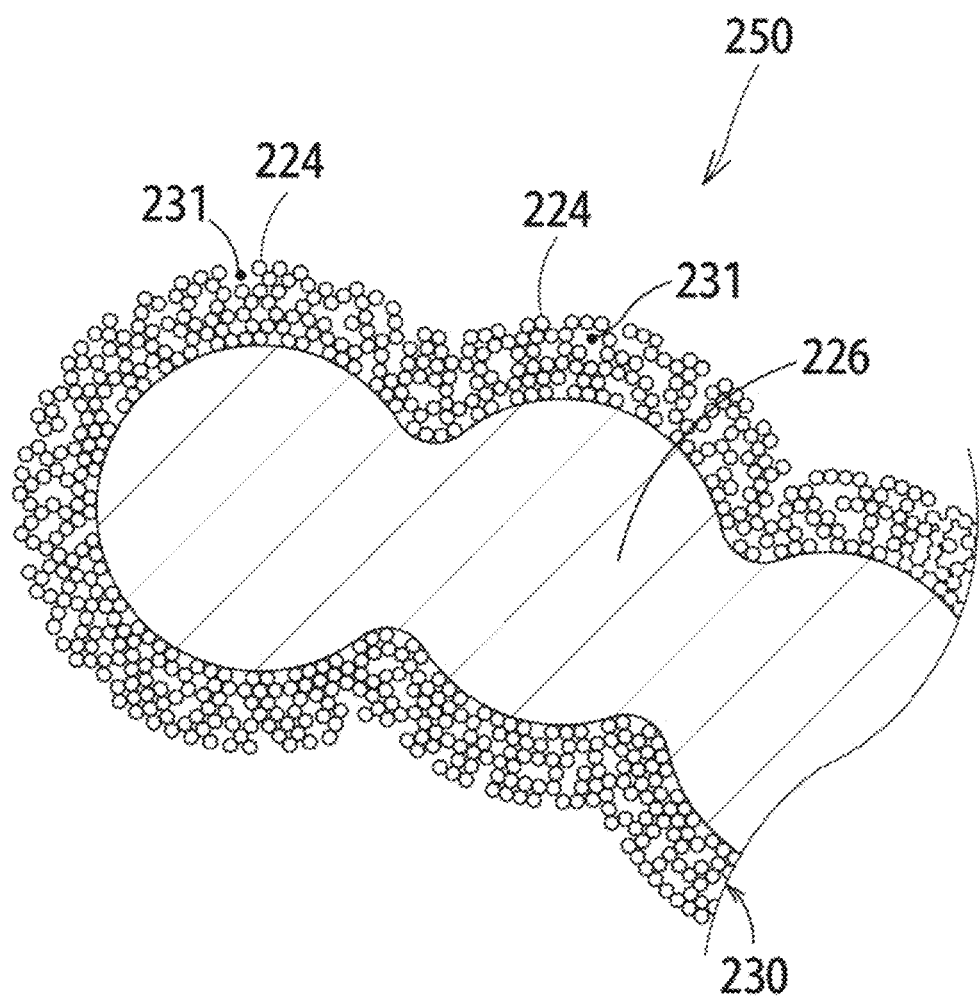
FIG. 15 is an illustrative sectional view, rendering a state that the microparticulate pore formation member shown in FIG. 14 is vanished.

Once the microparticulate pore formation member 251 is vanished from a micro particle coat layer 230 shown in FIG. 14, a state shown in FIG. 15 is obtained. As shown in the drawing, as the microparticulate pore formation member 251 vanishes, pores 231 are left inside the micro particle coat layer 230.

Figure 16:
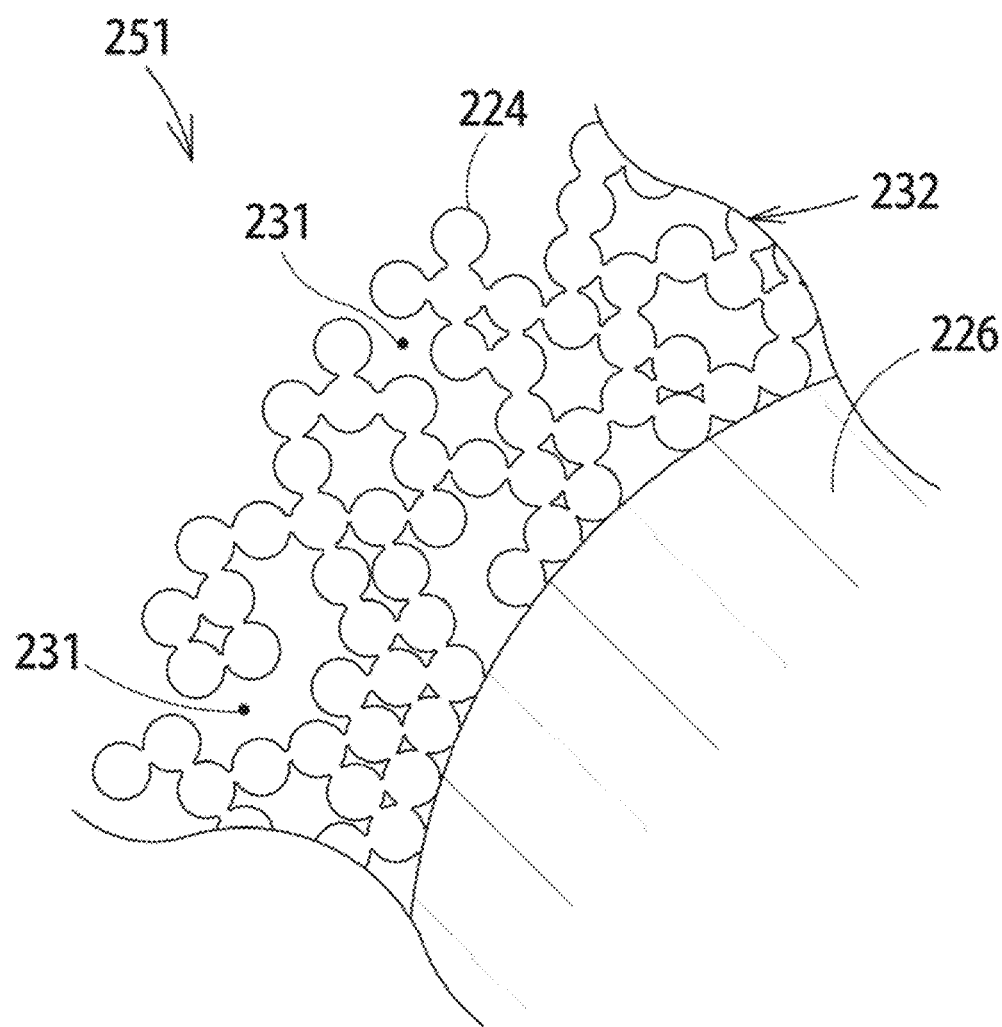
FIG. 16 is an enlarged illustrative sectional view, rendering a state that the second sintering powder shown in FIG. 15 is sintered.

FIG. 16 illustrates an enlarged section of a primary portion of the porous sintered body 226 which includes a sintered microparticulate layer 232 that is obtained by sintering the micro particle coat layer 230. As shown in this drawing, the pores 231 extend deep into the sintered microparticulate layer 232. This arrangement makes it possible to form required pores 231 inside the sintered microparticulate layer 232, and to dramatically increase the surface area of the porous sintered body 251. It is also possible to form pores leading to the surface of the sintered wall 126.

Figure 17:
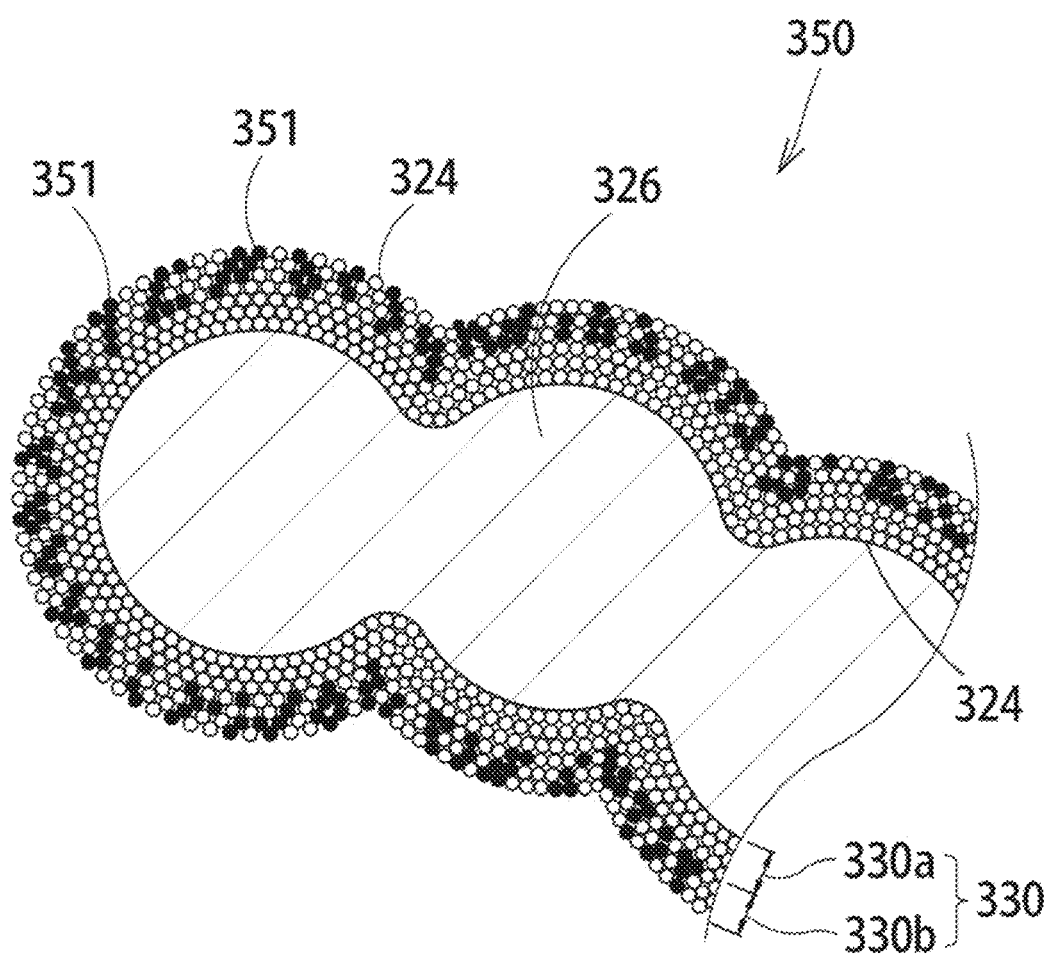
FIG. 17 is an illustrative sectional view, rendering a state that the microparticulate pore formation member is applied on a surface side.
Figure 18:
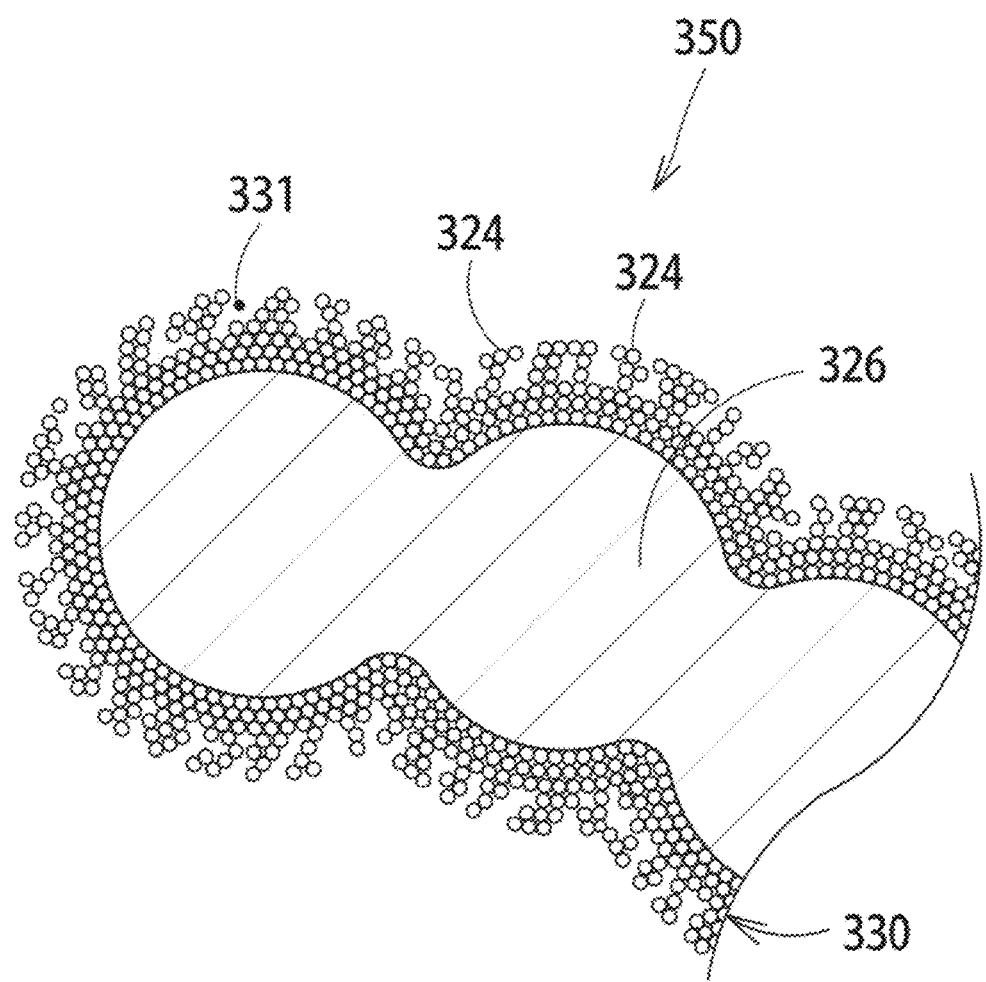
FIG. 18 is an illustrative sectional view, rendering a state that the microparticulate pore formation member shown in FIG. 17 is vanished.
Figure 19:
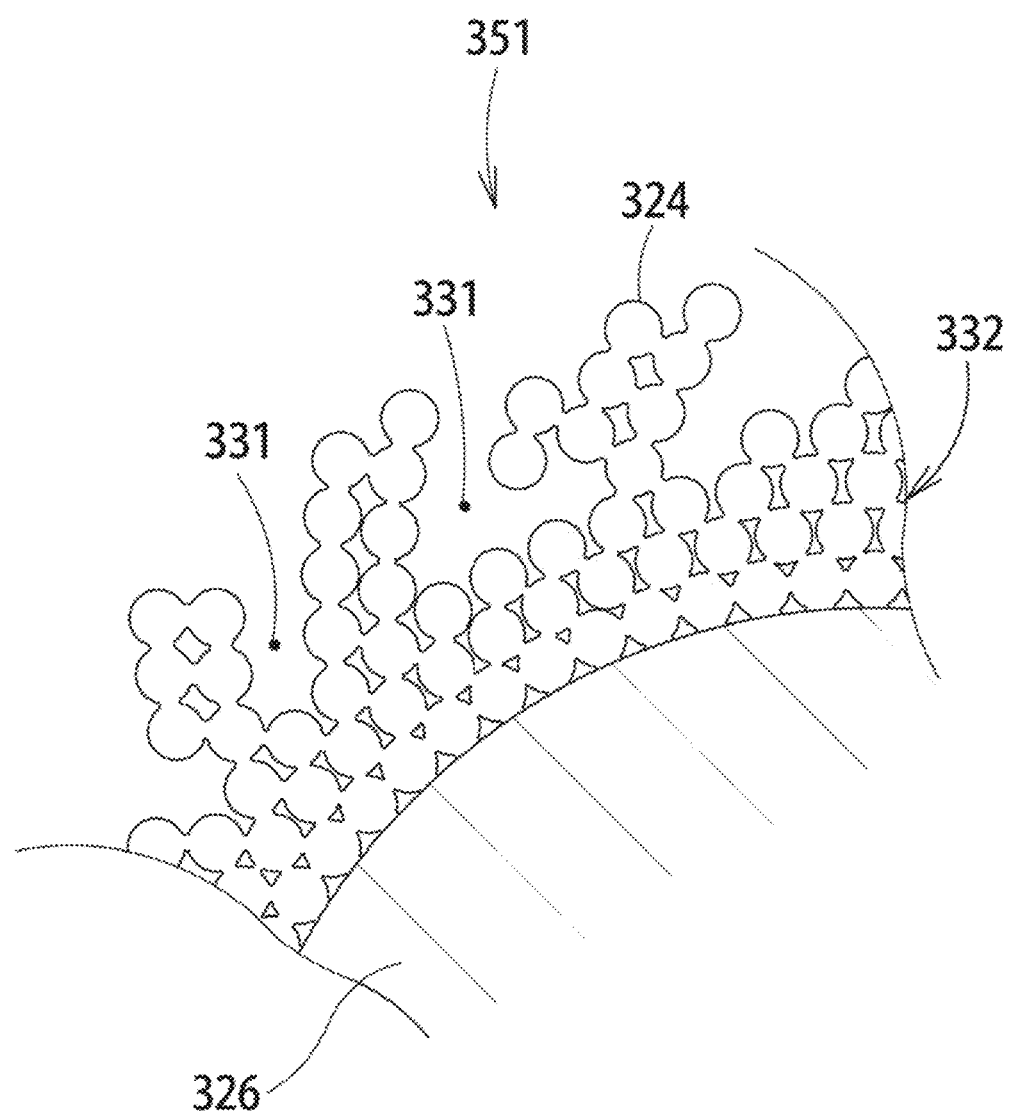
FIG. 19 is an enlarged illustrative sectional view, rendering a state that the second sintering powder shown in FIG. 18 is sintered.

FIG. 17 through FIG. 19 show an embodiment wherein pores are formed on a surface side of a sintered microparticulate layer 332. In the present embodiment, first, a first micro particle coat layer 330a, which is made only of a second sintering powder 324, is formed on a surface of a sintered wall 326, and then dehydrated/dried. Next, a second micro particle coat layer 330b is formed by applying the second sintering powder which contains the second sintering powder 324 and a predetermined amount of a microparticulate pore formation member 351. As a result, as shown in FIG. 17, there is formed a micro particle coat layer 330 which contains the microparticulate pore formation member 351 only in the second micro particle coat layer 330b that is formed on the surface side. The microparticulate pore formation member 351 is prepared in the same way as in the embodiment shown in FIG. 14.

Next, the microparticulate pore formation member 351 is vanished by performing a pore formation member vanishing step. As the microparticulate pore formation member 351 is vanished, as shown in FIG. 18, the micro particle coat layer 330 is left with pore spaces on its surface side, as spaces previously occupied by the microparticulate pore formation member.

The micro particle coat layer 330 shown in FIG. 18 then undergoes the second sintering step, to become a sintered microparticulate layer 332 as shown in FIG. 19, which is formed with pores 331 on its surface side.

The sintered microparticulate layer 332 having the structure described above establishes a reliable bond between the sintered wall 326 and the sintered microparticulate layer 332. Further, this gives porosity to the surface side of the porous sintered body 351, making it possible to increase the surface area. It should be noted here that in the embodiment described above, formation of the first micro particle coat layer 330a and the second micro particle coat layer 330b was performed first, and then the pore formation member vanishing step and the second sintering step were performed. However, it is also possible that the first micro particle coat layer undergoes a sintering step, then the second micro particle coat layer is formed, and thereafter, another sintering step is performed.

Figure 20:
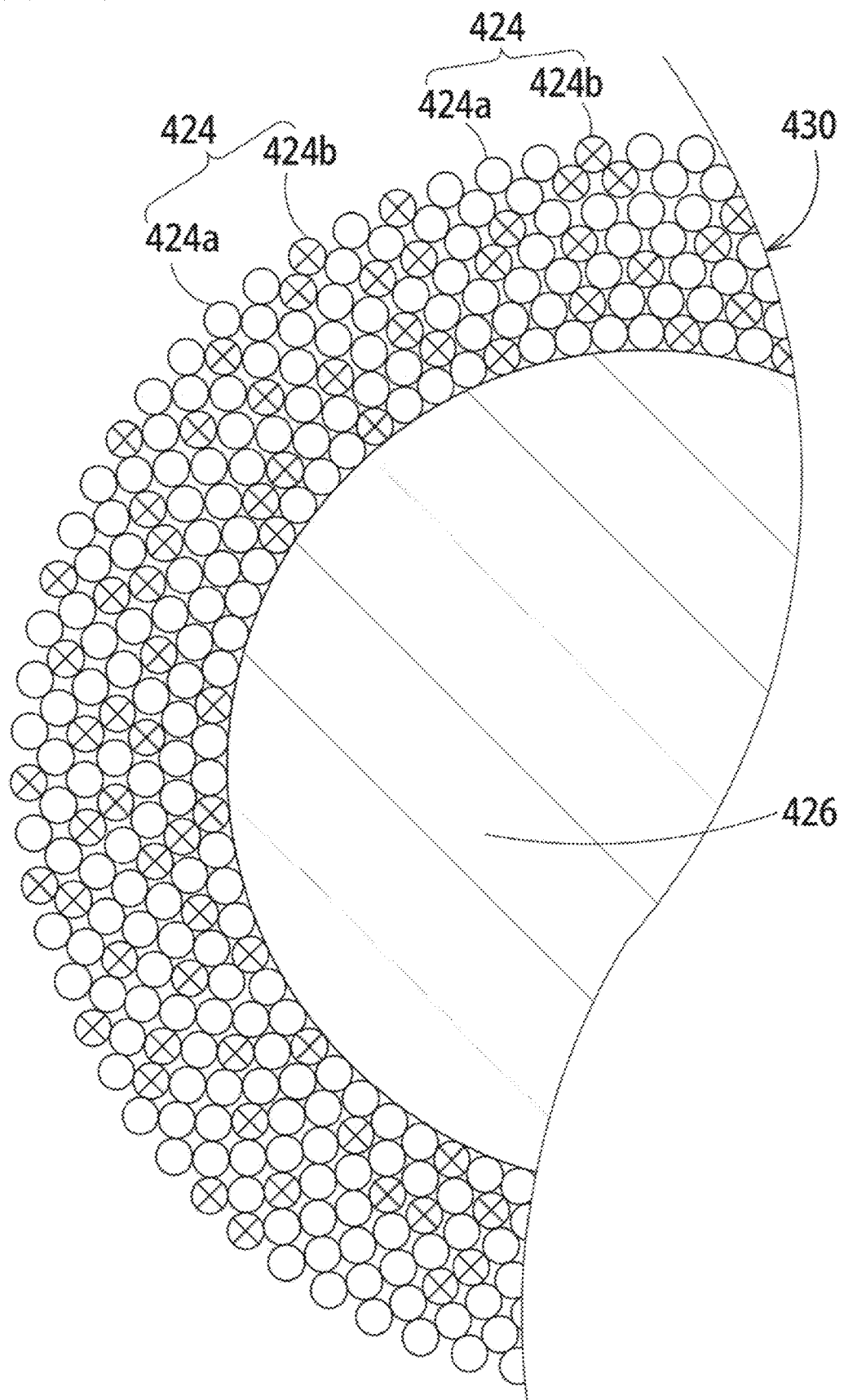
FIG. 20 is an enlarged illustrative sectional view, rendering a state that the second sintering powder blended with a plurality of kinds of sintering micro particles is held on a surface of a sintered wall.

Micro particles which constitute the sintered microparticulate layer according to the present invention is not limited to one kind. As shown in FIG. 20, two or more kinds of sintering micro particles 424a, 424b may be mixed to make a second sintering powder 424, which is then applied to a surface of a sintered wall 226, to form a micro particle coat layer 430, and then sintered in the same way as in the previous embodiment described above. For example, the second sintering powder may contain micro particles of Ni and micro particles of Cr, which makes it possible to forma layer of an Ni—Cr alloy on the surface of the sintered walls 226. If the Ni—Cr alloy layer is formed for increased corrosion resistance, then a higher sintering temperature may be used to melt the micro particles until the particles have lost their shapes completely.

On the other hand, there may also be an arrangement that the second sintering powder contains sintering micro particles and non-sintering micro particles, to make a structure that the sintering micro particles fix the non-sintering micro particles. For example, the second sintering powder contains micro particles of titanium oxide and micro particles of Ni so that the titanium oxide will work as a catalyser. In this case, it is preferable that necking sintering is utilized so that the micro particles of Ni will retain their particle shapes, and the second sintering step is performed in such a manner so that pores will be formed in the sintered microparticulate layer.

Figure 21:
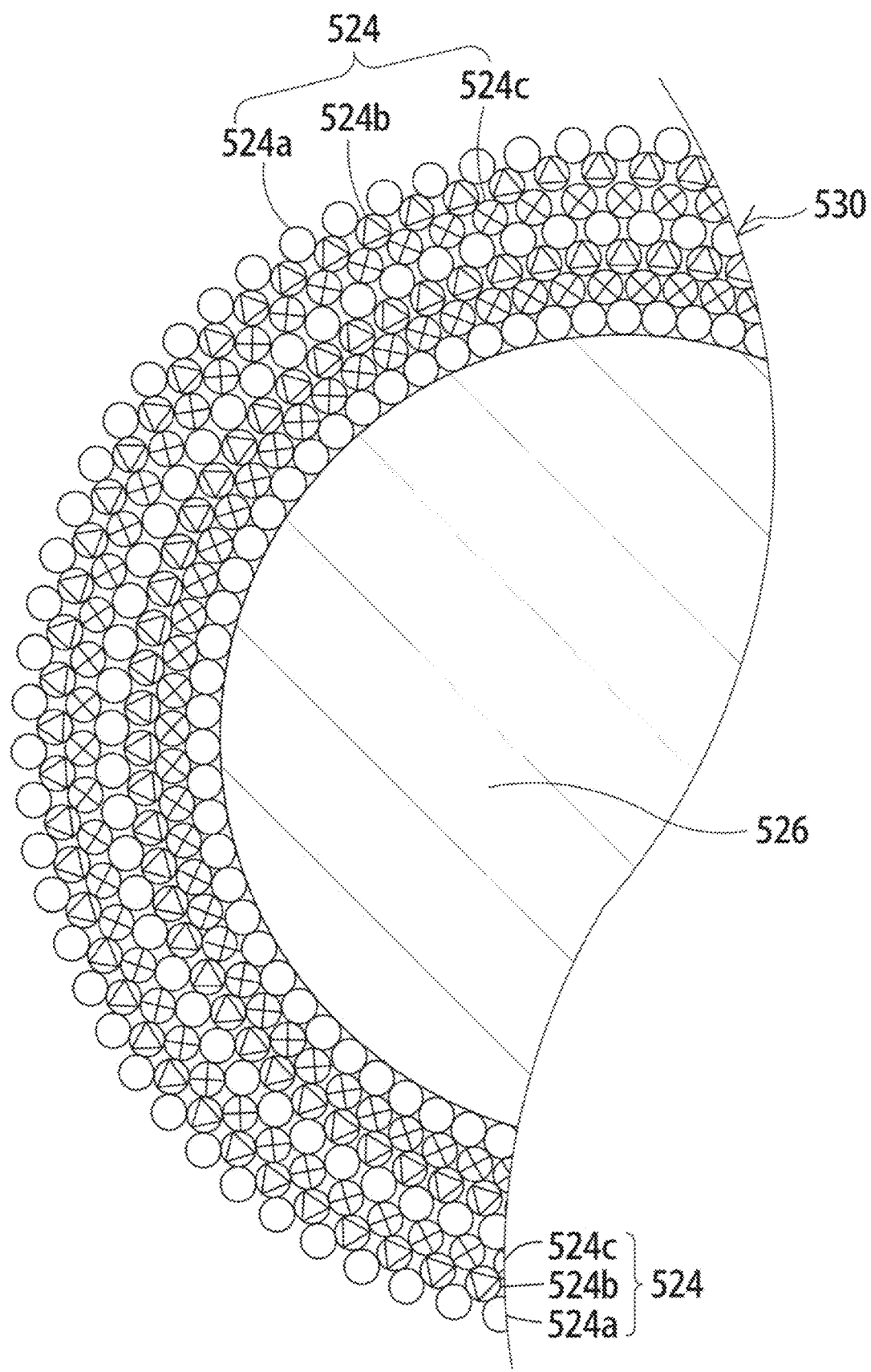
FIG. 21 is an enlarged illustrative sectional view, rendering a state that different sintering powders are applied in lamination, on a surface of a sintered wall.

The second sintering powder application step according to the present invention is not limited to a one-time step. For example, as shown in FIG. 21, two or more different kinds of second sintering powders 524a, 524b, 524c may be formed in lamination, as micro particle coat layers 530. In this case, all of these micro particle coat layers 530 may be sintered in a single second sintering step, or a plurality of sintering steps may be performed respectively for forming the micro particle coat layers 524a, 524b, 524c.

The embodiments covered thus far are cases where the present invention is applied to sheet-like porous sintered bodies. However, there is no specific limitations to the shape or dimensions of the porous sintered body according to the present invention. For example, a plurality of sheet-like porous sintered backing members before undergoing the first sintering step may be laminated to form a required three-dimensional porous body. Then, the first sintering step is performed to this body, and thereafter the second sintering powder application step and the second sintering step are performed. In this method, the first sintering powder between laminated sheets works as an adhesive. This arrangement makes it possible to obtain porous sintered backing members of a variety of three-dimensional shapes having a uniform porosity.

There can be a case where the second application step involves use of the second sintering powder which does not easily adhere to the surfaces of the sintered walls which is made of the first sintering powder. In this case, first, an undercoat sintered microparticulate layer which is made of a material having good affinity with the second sintering powder is formed on the surface of the sintered walls, and then the required second sintering powder is applied onto the undercoat sintered microparticulate layer.

The porous sintered body according to the present invention is applicable to a variety of purposes and apparatuses. For example, by using a powder which has catalyser capabilities, the present invention becomes applicable to materials for electrodes and power collectors in secondary batteries and fuel cells. The invention is also applicable to various gas sensors. Also, because the body has an extremely high airspace ratio, the invention is applicable to heat releasing members by forming the members from a power having a high thermal conductivity. Further, since it is possible to form a porous body of a required shape and density, it is possible to form a vibration controlling member which has a required vibration characteristic.

The present invention is not limited to the scope covered by the embodiments described thus far. For example, while the embodiments use sheet-like porous bodies, the invention is not limited by this. Kinds of the fibriform vanisher material and of the powder described do not limit the present invention, either. Further, in cases where a plurality of powders are used to form a porous sintered body, these powders may be applied to the fibriform vanisher material in a single sintering powder application step, or in a plurality of sintering powder application steps.

INDUSTRIAL APPLICABILITY

The present invention is capable of providing a porous sintered body which has a uniform porosity, a high level of freedom in forming, allowing to be formed into varieties of shapes and various levels of porosity, and to be formed to have an extremely large surface area.

LEGEND

126 Sintered Wall (Porous Sintered Backing Member, First Sintering Powder)
124 Second Sintering Powder
131 Pore
132 Sintered Microparticulate Layer
151 Porous Sintered Body

The invention claimed is:

1. A porous sintered body comprising;
    hollow cores following a vanished shape of an interlaced or otherwise structured fibriform vanisher material;
    sintered walls extending longitudinally along the cores, the sintered walls being obtained by sintering a first sintering powder comprising at least one of metal or ceramic held around the cores,
    voids corresponding to spaces between fibers of the fibriform vanisher material located between the sintered walls, each at a position outside of the sintered walls, the position outside of the sintered walls being a side of the sintered walls opposite to a side of the sintered walls closest to a core, and
    a sintered microparticulate layer formed on surfaces of the sintered walls, the sintered microparticulate layer having pores and being made from a material containing a second sintering powder comprising metal;
    wherein the first sintering powder has a first average particle size and the second sintering powder has a second average particle size that is smaller than the first average particle size;
    wherein the pores have an average opening size that is greater than the second average particle size; and
    wherein the cores and the voids communicate with each other via absent regions formed in the sintered walls.

2. The porous sintered body according to claim 1, wherein the pores are formed at least on an outer surface side of the sintered microparticulate layer.

3. The porous sintered body according to claim 1, wherein the sintered microparticulate layer is made of a material containing at least two different kinds of micro particle powders.

4. The porous sintered body according to claim 1, wherein the sintered microparticulate layer is made of a material containing a non-sintering micro particle powder.

5. The porous sintered body according to claim 1, wherein the sintered microparticulate layer includes a plurality of layers of different compositions.

6. The porous sintered body according to claim 1, wherein part or all of particles in the second sintering powder of the sintered microparticulate layer retain at least part of their particle shapes after sintering.

7. The porous sintered body according to claim 1, wherein at least part of the particles in the second sintering powder of the sintered microparticulate layer are melted together without retaining their particle shapes.

8. The porous sintered body according to claim 1, wherein the sintered microparticulate layer has pores of an average opening size of 5 nm through 1 µm.

9. The porous sintered body according to claim 1, wherein the cores have a diameter of 5 µm through 100 µm, whereas the sintered walls are made by sintering the first sintering powder of an average particle size of 0.5 µm through 30 µm and has an average thickness of 0.5 µm through 50 µm; and
    the sintered microparticulate layer is made by sintering the second sintering powder of an average particle size of 20 nm through 1000 nm, and has a thickness of 20 nm through 1000 nm.

10. The porous sintered body according to claim 1, wherein the porous sintered body is sheet-like and has a thickness of 30 µm through 1000 µm.

11. A method of making a porous sintered body according to claim 1, comprising:
    a fibriform vanisher material formation step of interlacing or otherwise structuring a fibriform vanisher material into a porous body of a desired shape;
    a first sintering powder application step of applying a first sintering powder on outer circumferential surfaces of the fibriform vanisher material;
    a vanishing material vanishing step of vanishing the fibriform vanisher material;
    a first sintering step of sintering the first sintering powder thereby obtaining a porous sintered backing member which includes: hollow cores resulting from vanishing the fibriform vanisher material; sintered walls extending longitudinally of the cores; and voids between the sintered walls; the cores and the voids communicating with each other via absent regions formed in the sintered walls;
    a second sintering powder application step of applying a powder containing a second sintering powder which has a smaller average particle size than the first sintering powder, on a surface of the sintered walls; and
    a second sintering step of sintering the second sintering powder thereby obtaining a sintered microparticulate layer formed with predetermined pores, on an outer circumference of the sintered walls;
    wherein the porous sintered body that is made is the porous sintered body of claim 1.

12. The method of making a porous sintered body according to claim 11, wherein the fibriform vanisher material formation step includes:
    a slurry preparation step of adjusting a slurry by mixing the fibriform vanisher material, the sinterable powder and a dispersion liquid in which these components can stay in a mixed state in a dispersed manner; and
    a paper-making step of forming a sheet-body out of the slurry by means of wet papermaking method; whereas the sintering powder application step includes:
    a dehydrating-drying step of dehydrating and/or drying the sheet-like formed-body which contains the slurry, thereby allowing the powder to be held on an outer circumference of the interlaced fibriform vanisher material.

13. The method of making a porous sintered body according to claim 11, wherein the first sintering powder application step includes:
    an impregnation step of impregnating the porous body, which has been formed into a desired shape in the fibriform vanisher material formation step, with the slurry in which the first sintering powder is dispersed; and
    a dehydrating-drying step of dehydrating and/or drying the formed body which contains the slurry, thereby allowing the first sintering powder to be held on an outer circumferential surface of the interlaced fibriform vanisher material.

14. The method of making a porous sintered body according to claim 11, wherein the second sintering powder application step includes:
- a second impregnation step of impregnating the porous sintered backing member, which has undergone the first sintering step, with a second slurry in which the second sintering powder is dispersed; and
- a second dehydrating-drying step of dehydrating and/or drying the porous sintered backing member which contains the second slurry, thereby allowing the second sintering powder to be held on surfaces of the sintered walls of the porous sintered backing member.

15. The method of making a porous sintered body according to claim 11, wherein microparticulate pore formation member having a predetermined diameter is applied, together with the second sintering powder, onto the surfaces of the sintered walls of the porous sintered backing member in the second sintering powder application step; and
- the pore formation member is vanished in the second sintering step or in a pore formation member vanishing step performed before the second sintering step.

16. The method of making a porous sintered body according to claim 11, wherein the second sintering powder application step includes one, two or more powder application steps for application of at least two different kinds of micro particulate powders including the second sintering powder onto the surface of the sintered walls.

17. The method of making a porous sintered body according to claim 11, wherein the first sintering powder application step and/or the second sintering powder application step are performed under a vacuum environment by means of impregnating a slurry which contains a sintering powder.

18. The method of making a porous sintered body according to claim 11, wherein part or all of particles in the second sintering powder of the sintered microparticulate layer retain at least part of their particle shapes after sintering.

19. The porous sintered body according to claim 1, wherein the second sintering powder comprises Ni, Cr or Pt.

* * * * *